(12) United States Patent
Wang et al.

(10) Patent No.: US 11,372,688 B2
(45) Date of Patent: Jun. 28, 2022

(54) RESOURCE SCHEDULING METHOD, SCHEDULING SERVER, CLOUD COMPUTING SYSTEM, AND STORAGE MEDIUM

(71) Applicant: Tencent Technology (Shenzhen) Company Limited, Shenzhen (CN)

(72) Inventors: Min Wang, Shenzhen (CN); Yudong Chen, Shenzhen (CN); Dekai Li, Shenzhen (CN); Li Li, Shenzhen (CN); Jindong Zhang, Shenzhen (CN); Bo Pang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 136 days.

(21) Appl. No.: 16/799,652

(22) Filed: Feb. 24, 2020

(65) Prior Publication Data
US 2020/0192724 A1   Jun. 18, 2020

Related U.S. Application Data

(63) Continuation of application No. PCT/CN2018/107275, filed on Sep. 25, 2018.

(30) Foreign Application Priority Data

Sep. 29, 2017  (CN) .......................... 201710911639.9

(51) Int. Cl.
*G06F 9/46* (2006.01)
*G06F 9/50* (2006.01)
(Continued)

(52) U.S. Cl.
CPC ........ *G06F 9/5077* (2013.01); *G06F 9/45558* (2013.01); *G06F 9/4881* (2013.01); *G06F 9/5011* (2013.01); *G06F 2009/45595* (2013.01)

(58) Field of Classification Search
CPC .................................................. G06F 9/45558
(Continued)

(56) References Cited

U.S. PATENT DOCUMENTS 8,923,320 B2 * 12/2014 Dasari ................ H04L 12/4641
                                                         370/437
9,213,646 B1 * 12/2015 LaPanse ............. G06F 12/0871
(Continued)

FOREIGN PATENT DOCUMENTS

CN           103002010 A         3/2013
CN           104793982 A         7/2015
(Continued)

OTHER PUBLICATIONS

Tencent Technology, ISRWO, PCT/CN2018/107275, Nov. 30, 2019, 6 pgs.
(Continued)

*Primary Examiner* — Mehran Kamran
(74) *Attorney, Agent, or Firm* — Morgan, Lewis & Bockius LLP

(57) ABSTRACT

Embodiments of this application disclose a resource scheduling method performed at a scheduling server. Virtual machine (VM) information of a to-be-created VM is obtained and common resource information is obtained. A preset resource information private copy is updated according to the common resource information. The resource information private copy includes host machine information corresponding to a preset host machine. Finally, according to the resource information private copy, at least one candidate host machine meeting the VM information is obtained, a target host machine is obtained from the at least one candidate host machine, and the VM is created on the target host machine. In the solution, the resource information private copy can be updated in time before the resource scheduling
(Continued)

is performed, which ensures synchronization of the resource information private copy and the common resource information, so that a better resource scheduling result is achieved.

19 Claims, 8 Drawing Sheets

(51) Int. Cl.
G06F 9/455 (2018.01)
G06F 9/48 (2006.01)
(58) Field of Classification Search
USPC .......................................................... 718/104
See application file for complete search history.

(56) References Cited

U.S. PATENT DOCUMENTS

| | | | |
|---|---|---|---|
| 9,292,350 B1* | 3/2016 | Pendharkar | G06F 9/5044 |
| 2008/0089338 A1* | 4/2008 | Campbell | H04L 45/00 |
| | | | 370/392 |
| 2009/0031312 A1* | 1/2009 | Mausolf | G06F 9/5072 |
| | | | 718/102 |
| 2010/0049930 A1 | 2/2010 | Pershin et al. | |
| 2011/0225277 A1* | 9/2011 | Freimuth | G06F 9/45558 |
| | | | 718/1 |
| 2012/0246645 A1* | 9/2012 | Iikura | G06F 8/61 |
| | | | 718/1 |
| 2012/0278802 A1* | 11/2012 | Nilakantan | H04L 41/0886 |
| | | | 718/1 |
| 2013/0067484 A1* | 3/2013 | Sonoda | G06F 9/505 |
| | | | 718/103 |
| 2013/0238785 A1* | 9/2013 | Hawk | G06F 9/5077 |
| | | | 709/224 |
| 2013/0297964 A1* | 11/2013 | Hegdal | G06F 11/0712 |
| | | | 714/2 |
| 2013/0346615 A1* | 12/2013 | Gondi | G06F 9/5077 |
| | | | 709/226 |
| 2014/0026144 A1* | 1/2014 | Pack | G06F 9/505 |
| | | | 718/105 |
| 2014/0068613 A1* | 3/2014 | Iriguchi | G06F 8/656 |
| | | | 718/1 |
| 2015/0186228 A1* | 7/2015 | Kumar | G06F 9/5027 |
| | | | 714/4.12 |
| 2015/0236971 A1* | 8/2015 | Sesha | H04L 43/16 |
| | | | 709/226 |
| 2016/0050161 A1* | 2/2016 | Da | H04L 45/00 |
| | | | 709/226 |
| 2016/0142336 A1* | 5/2016 | Udupi | G06F 9/5077 |
| | | | 709/226 |
| 2017/0116015 A1* | 4/2017 | Cropper | G06F 9/45558 |
| 2017/0235773 A1* | 8/2017 | Maturi | H04L 67/1097 |
| | | | 707/736 |
| 2017/0357537 A1* | 12/2017 | Tian | G06F 3/0605 |
| 2018/0074864 A1* | 3/2018 | Chen | G06F 9/5022 |
| 2018/0095776 A1* | 4/2018 | Tsai | G06F 9/505 |
| 2018/0191859 A1* | 7/2018 | Sharma | H04L 67/38 |
| 2018/0225137 A1* | 8/2018 | Bianchini | G06F 9/485 |
| 2018/0239633 A1* | 8/2018 | Li | G06F 9/4401 |
| 2018/0321976 A1* | 11/2018 | Chen | G06F 9/505 |
| 2019/0004844 A1* | 1/2019 | Zhang | G06F 9/5077 |
| 2019/0163517 A1* | 5/2019 | Fontoura | G06F 9/5005 |
| 2019/0173770 A1* | 6/2019 | Gill | H04L 67/1097 |
| 2019/0238911 A1* | 8/2019 | Slutsky | H04N 21/8547 |
| 2020/0026576 A1* | 1/2020 | Kaplan | G06Q 10/06313 |
| 2021/0144056 A1* | 5/2021 | Chakrapani Rangarajan | |
| | | | H04L 41/0806 |

FOREIGN PATENT DOCUMENTS

| | | |
|---|---|---|
| CN | 105260229 A | 1/2016 |
| CN | 106020937 A | 10/2016 |

OTHER PUBLICATIONS

Tencent Technology, IPRP, PCT/CN2018/107275, Mar. 31, 2020, 5 pgs.

* cited by examiner

RESOURCE SCHEDULING METHOD, SCHEDULING SERVER, CLOUD COMPUTING SYSTEM, AND STORAGE MEDIUM

CROSS-REFERENCE TO RELATED APPLICATIONS

This application is a continuation application of PCT/CN2018/107275, entitled "RESOURCE SCHEDULING METHOD, SCHEDULING SERVER, CLOUD COMPUTING SYSTEM, AND STORAGE MEDIUM" filed on Sep. 25, 2018, which claims priority to Chinese Patent Application No. 201710911639.9 filed with the Chinese Patent Office on Sep. 29, 2017 and entitled "RESOURCE SCHEDULING METHOD AND APPARATUS, CLOUD COMPUTING SYSTEM, AND STORAGE MEDIUM", all of which are incorporated by reference in their entirety.

FIELD OF THE TECHNOLOGY

This application relates to the field of cloud technologies, and specifically, to a resource scheduling method, a scheduling server, a cloud computing system, and a storage medium.

BACKGROUND OF THE DISCLOSURE

A cloud computing system generally includes schedulers, host machines, and the like. A scheduler may create one or more virtual machines (VM) on a host machine by using VM software. There are a large quantity of host machines in the cloud computing system. When a VM is created, a process of selecting a host machine on which the VM is created is called resource scheduling. A component performing resource scheduling is called a scheduler.

In some embodiments, when the scheduler is performing resource scheduling and a scale of the host machines and resource scheduling requests increase to a certain degree, the time for which the scheduler processes a single resource scheduling request obviously increases. In addition, subsequent requests always queue up to be processed. For example, a two-level scheduling architecture is used, where a central resource manager first provides a host machine resource to the scheduler by using a resource invitation, and the scheduler selects a host machine within a range of the resource invitation, to complete the resource scheduling process. Moreover, only after the scheduler completes the resource scheduling, the central resource manager provides the host machine resource to another scheduler by using the resource invitation. For example, the entire data center of the cloud computing system includes a host machine A, a host machine B, a host machine C, a host machine D, a host machine E, and the like. The central resource manager provides the host machine A and the host machine B to a scheduler 1 by using the resource invitation. In this case, the scheduler 1 can select one host machine only from the host machine A and the host machine B. Only after the scheduler 1 completes the resource scheduling, the central resource manager provides the host machine resource to a scheduler 2 by using the resource invitation.

The foregoing embodiments have the following problems: On one hand, a scheduler can only select a host machine within a range of the resource invitation, which reduces a scale of selectable host machines, and consequently a better resource scheduling result cannot be ensured. On the other hand, the central resource manager provides the host machine resource to a scheduler first, and after the scheduler completes the resource scheduling, the central resource manager provides the host machine resource to another scheduler. Consequently, the scheduler needs to wait when performing resource scheduling, resulting in high latency and a low throughput rate of the resource scheduling.

SUMMARY

Embodiments of this application provide a resource scheduling method, a scheduling server, a cloud computing system, and a storage medium, which are capable of achieving a better resource scheduling result and improving the efficiency of resource scheduling.

To resolve the foregoing technical problem, the embodiments of this application provide the following technical solutions:

A resource scheduling method is performed at a scheduling server having one or more processors and memory storing a plurality of programs to be executed by the one or more processors, the method comprising:

obtaining, by the scheduling server, virtual machine (VM) information corresponding to a to-be-created VM;

obtaining, by the scheduling server, common resource information, the common resource information including host machine information corresponding to all host machines in a cloud computing system;

updating, by the scheduling server, a preset resource information private copy according to the common resource information, the resource information private copy including host machine information corresponding to a preset host machine;

obtaining, by the scheduling server according to the resource information private copy, at least one candidate host machine meeting the VM information; and obtaining, by the scheduling server, a target host machine from the at least one candidate host machine, and creating the VM on the target host machine.

A scheduling server includes one or more processors, memory coupled to the one or more processors and a plurality of programs stored in the memory that, when executed by the one or more processors, cause the scheduling server to perform the aforementioned resource scheduling method.

A non-transitory computer readable storage medium stores a plurality of machine readable instructions in connection with a scheduling server having one or more processors, wherein the plurality of machine readable instructions, when executed by the one or more processors, cause the terminal to perform the foregoing resource scheduling method.

In the embodiments of this application, VM information corresponding to a to-be-created VM is obtained and common resource information is obtained. The common resource information includes host machine information corresponding to all host machines in a cloud computing system. Then, a preset resource information private copy is updated according to the common resource information and the VM information. The resource information private copy includes host machine information corresponding to a preset host machine. Finally, according to the resource information private copy, at least one candidate host machine meeting the VM information is obtained, a target host machine is obtained from the at least one candidate host machine, and the VM is created on the target host machine. In the solution, the resource information private copy can be updated in time before the resource scheduling is performed, which ensures synchronization of the resource information private copy and the common resource information, so that a better resource scheduling result is achieved, and there is no need to wait during the resource scheduling, improving the efficiency of the resource scheduling.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person skilled in the art based on the embodiments of this application without creative efforts shall fall within the protection scope of this application.

In the description that follows, specific embodiments of this application will be described with reference to steps and symbolic representations of operations that are performed by one or more computers, unless indicated otherwise. As such, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the principle of this application is being described in the foregoing text, it is not meant to be limiting as a person skilled in the art will appreciate that the various steps and operations described hereinafter may be implemented in hardware.

Embodiments of this application provide a resource scheduling method, a scheduling server, a cloud computing system, and a storage medium.

Figure 1:
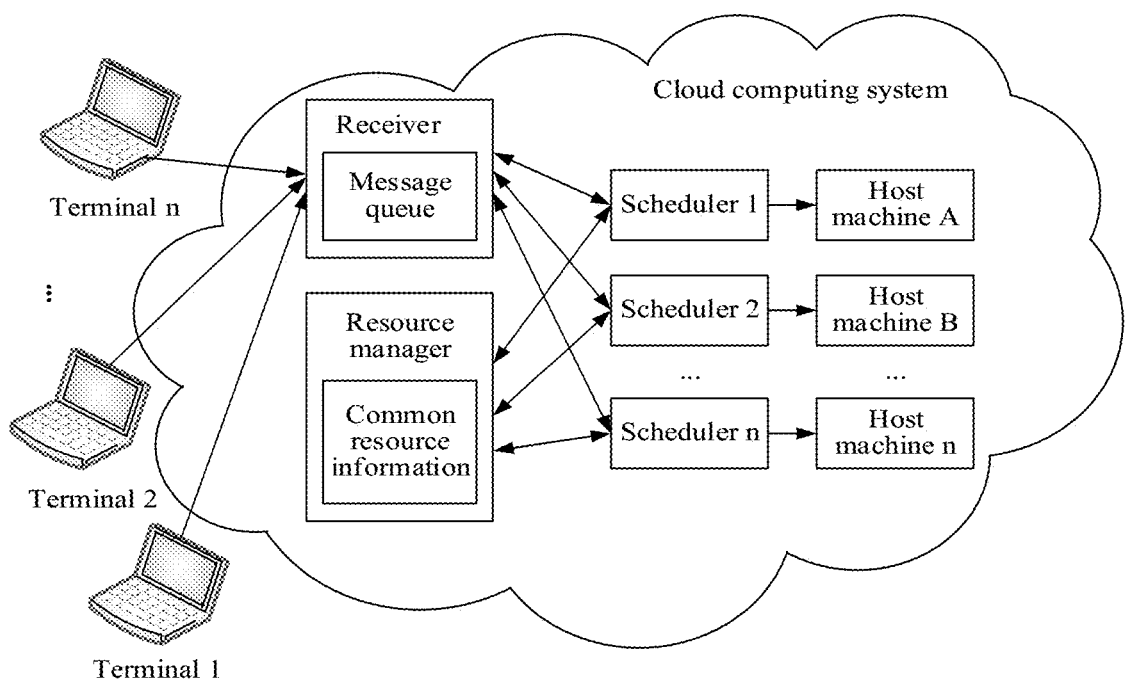
FIG. 1 is a schematic diagram of a scenario of a resource scheduling system according to an embodiment of this application.

FIG. 1 is a schematic diagram of a scenario of a resource scheduling system according to an embodiment of this application. The resource scheduling system may be a cloud computing system. The cloud computing system may include a resource scheduling apparatus. The resource scheduling apparatus may be specifically integrated into a scheduling server. The scheduling server may be a scheduler in the cloud computing system. In other words, each scheduler may include a resource scheduling apparatus. There may be one or more schedulers in the cloud computing system, for example, a scheduler 1, a scheduler 2, . . . , and a scheduler n shown in FIG. 1. The scheduler is configured to obtain virtual machine (VM) information corresponding to a to-be-created VM and obtain common resource information. The common resource information may include host machine information corresponding to all host machines in the cloud computing system. Then, the scheduler may update a preset resource information private copy according to the common resource information and the VM information. The resource information private copy includes host machine information corresponding to a preset host machine. The resource information private copy maintained by the scheduler may be used for selecting an appropriate host machine for the to-be-created VM. The scheduler may further obtain, according to the resource information private copy, at least one candidate host machine meeting the VM information; and obtain a target host machine from the at least one candidate host machine, create the VM on the target host machine, and the like.

In addition, the cloud computing system may further include one or more host machines, for example, a host machine A, a host machine B, . . . , and a host machine n shown in FIG. 1. The host machine may be configured to receive a request of creating a VM sent by the scheduler, and create one or more VMs according to the request.

The cloud computing system may further include a receiver. The receiver is mainly configured to receive a VM creation request sent by one or more terminals. The VM creation request may carry VM information. Then, the receiver may encapsulate each received VM creation request into a message, and store the message into a preset message queue, so that the scheduler may obtain the message from the message queue and extract the VM information of the to-be-created VM from the message. When a plurality of messages exist in the message queue, a plurality of schedulers may concurrently obtain the messages and select host machines for different to-be-created VMs.

The cloud computing system may further include a resource manager. The resource manager is mainly configured to maintain the common resource information, so that the scheduler may obtain the common resource information from the resource manager. The common resource information is used for storing and maintaining host machine information corresponding to all host machines in the cloud computing system.

The schematic diagram of the scenario of the resource scheduling system shown in FIG. 1 is merely an example. The resource scheduling system and the scenario described in the embodiments of this application are for more clearly describing the technical solutions in the embodiments of this application, and do not constitute a limitation on the technical solutions provided in the embodiments of this application. Persons of ordinary skill in the art may learn that, with evolution of a cloud computing system and appearance of a new service scenario, the technical solutions provided in the embodiments of this application also apply to a similar technical problem.

Detailed descriptions are respectively performed below.

In this embodiment, descriptions are provided from the perspective of a resource scheduling apparatus. The resource scheduling apparatus may be specifically integrated into a network device such as a scheduling server or a gateway.

A resource scheduling method may be performed by the scheduling server. The resource scheduling method may include: obtaining VM information corresponding to a to-be-created VM; obtaining common resource information, the common resource information including host machine information corresponding to all host machines in a cloud computing system; updating a preset resource information private copy according to the common resource information and the VM information, the resource information private copy including host machine information corresponding to a preset host machine; obtaining, according to the resource information private copy, at least one candidate host machine meeting the VM information; and obtaining a target host machine from the at least one candidate host machine, and creating the VM on the target host machine.

Figure 2:
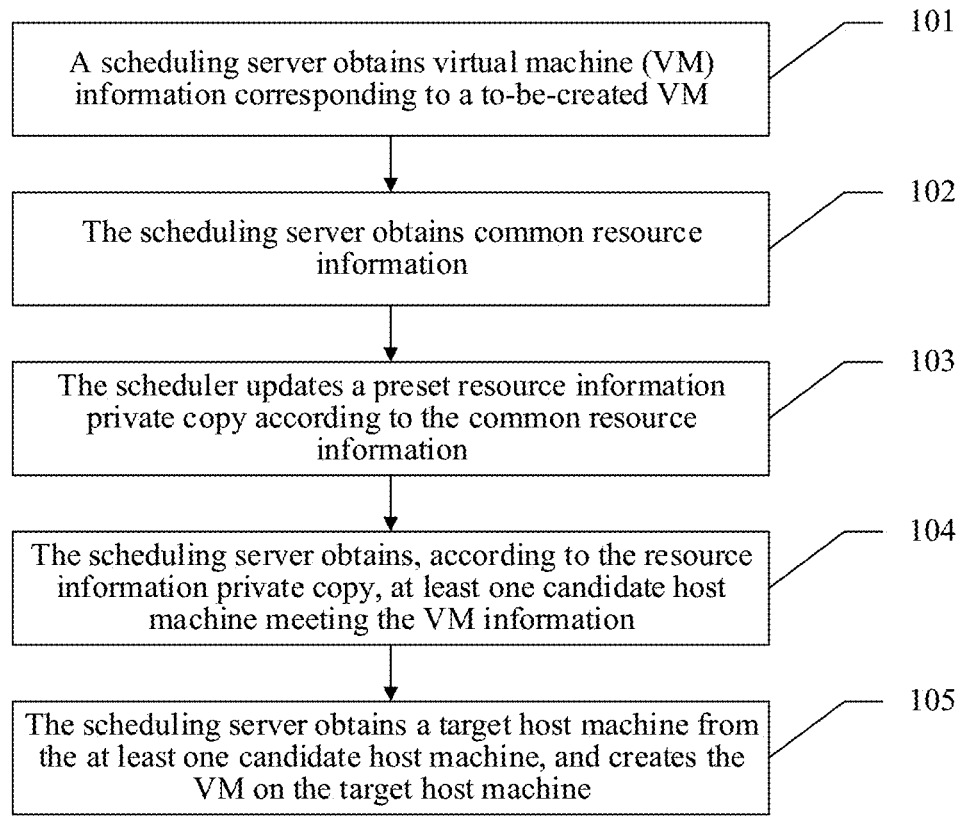
FIG. 2 is a schematic flowchart of a resource scheduling method according to an embodiment of this application.

FIG. 2 is a schematic flowchart of a resource scheduling method according to a first embodiment of this application. The resource scheduling method shown in FIG. 2 may be performed by, for example, a scheduling server. The resource scheduling method includes the following steps:

In step 101, the scheduling server obtains VM information corresponding to a to-be-created VM.

For example, the scheduling server may obtain the VM information corresponding to the to-be-created VM from a preset message queue in a cloud computing system. The VM is an entire computer system that is simulated through software, has a hardware system function and is run in an isolated environment.

A message in the message queue may be an asynchronous task. A message in the message queue flows in the message queue. Each component in the cloud computing system has an identity of a producer or a consumer. The producer transmits a message to the message queue. The consumer receives a message from the message queue. For example, a receiver is used as a producer in the cloud computing system. After receiving a VM creation request carrying the VM information sent by a terminal, the receiver encapsulates the VM information into a message, and stores the message into the message queue. The VM information is queued in the message queue to wait for the scheduling server to perform resource scheduling. As a consumer, the scheduling server extracts the VM information from the message queue, and selects a host machine for the to-be-created VM corresponding to the VM information.

The VM information may include processor information, internal memory information, and disk information required by the to-be-created VM. The VM information may include at least one of resource requirements of the to-be-created VM for a solid state drive, a cloud disk, a private network, a network adapter, a router, a network structure, a data center, a rack, a type of a host machine, a resource pool to which a host machine belongs, and a type of a VM. It may be understood that, the type of the VM information may be flexibly set according to actual requirements, and the specific content is not limited herein.

In step 102, the scheduling server obtains common resource information.

The common resource information is resource data of the entire data center stored and maintained by the cloud computing system. The common resource information includes host machine information corresponding to all host machines in the cloud computing system. It may be understood that, the common resource information may be maintained by a resource manager, or may be maintained by another device in the cloud computing system. The scheduling server may obtain the common resource information from the device maintaining the common resource information. For example, if the common resource information is maintained by the resource manager in the cloud computing system, the scheduling server may obtain the common resource information from the resource manager. For ease of description, in embodiments of this application, the resource manager maintaining the common resource information is used as an example for description.

The common resource information is globally unique in the cloud computing system, and may be maintained in a form of a logic data table. For example, each row in the data table represents a host machine, and each column in the data table represents a type of resource included in the host machine. Resources may include an Internet protocol (IP) address of the host machine, an available central processing unit (CPU), an available internal memory, and an available disk. In the maintenance process, an operation such as adding, reading, updating, or deleting may be performed on the common resource information. The operation corresponds to a process such as getting online, changing, or getting offline of a host machine resource in the data center.

A host machine is a physical computer configured to install VM software. One or more VMs may be created on one host machine through the VM software.

In some embodiments, the host machine information may include a host machine identifier, an IP address, a machine type, an operating system name, a kernel version, a CPU type, a virtualization manner, a logical area number, an Internet data center number, a state of the host machine, whether to support a cloud disk, whether to support a solid state drive (SSD), a network version, a CPU node resource quota, an available internal memory resource, and an available disk resource, and the specific content is not limited herein.

When the host machine enters the cloud computing system, necessary initialization needs to be performed through a host machine introducing process. The host machine reports its host machine information to the resource manager, and the resource manager may store the host machine information into the common resource information. In some embodiments, the host machine may alternatively report its host machine information to the scheduling server. The scheduling server may store the host machine information into a resource information private copy. In some embodiments, the scheduling server may transmit an information obtaining request to the resource manager in real time or at a preset interval, receive the common resource information fed back by the resource manager based on the information obtaining request, and update the resource information private copy according to the common resource information. In some embodiments, when the common resource information is updated, the resource manager actively transmits updated host machine information to the scheduling server.

In step 103, the scheduling server updates a preset resource information private copy according to the common resource information.

The scheduling server maintains a resource information private copy in a form of a buffer that is of the common resource information in an internal memory of the scheduling server. The resource information private copy includes host machine information corresponding to a preset host machine. The preset host machine may be some or all host machines of the host machines in the cloud computing system. To achieve a better resource scheduling result, before performing the resource scheduling, the scheduling server needs to synchronize the resource information private copy with the common resource information, and may obtain the common resource information and update the resource information private copy according to the common resource information, to ensure consistency between the resource information private copy and the common resource information.

To reduce update time, the resource information private copy may be updated according to the common resource information and the VM information. In some embodiments, the step of updating the preset resource information private copy according to the common resource information and the VM information includes: performing screening to obtain target host machine information meeting the VM information from the common resource information, and adding the target host machine information to the preset resource information private copy.

In some embodiments, the step of performing screening to obtain target host machine information meeting the VM information from the common resource information, and adding the target host machine information to the preset resource information private copy includes the following steps:

Step S1. The scheduling server performs screening to obtain target host machine information meeting the VM information from the common resource information in a case that the resource information private copy is updated for the first time.

Step S2. The scheduling server copies the target host machine information to the resource information private copy.

Step S3. The scheduling server obtains a current timestamp, and sets the current timestamp to a full update timestamp and an incremental update timestamp.

Step S4. The scheduling server stores the full update timestamp and the incremental update timestamp to the resource information private copy.

Specifically, the scheduling server first determines whether the resource information private copy is updated for the first time, for example, may determine whether the resource information private copy is empty. If so, it is determined that the resource information private copy is updated for the first time; and if not, it is determined that the resource information private copy is not updated for the first time. In a case that the resource information private copy is updated for the first time, the current resource information private copy is empty, and in this case, full update needs to be performed, that is, performing screening to obtain target host machine information meeting the VM information from the common resource information, and copying the target host machine information to the resource information private copy. The common resource information may alternatively be directly fully copied as the resource information private copy.

After the target host machine information is copied to the resource information private copy, a full update timestamp and an incremental update timestamp need to be recorded. In some embodiments, the scheduling server obtains a current timestamp, and sets the current timestamp as the full update timestamp and the incremental update timestamp. For example, the current timestamp is 11:00 a.m. on Sep. 15, 2017, and in this case, the full update timestamp and the incremental update timestamp both are 11:00 a.m. on Sep. 15, 2017. Then, the full update timestamp and the incremental update timestamp are stored into the resource information private copy, to complete the current update.

In some embodiments, the step of performing screening to obtain target host machine information meeting the VM information from the common resource information, and adding the target host machine information to the preset resource information private copy includes the following steps:

Step S11. The scheduling server obtains a time difference between a current timestamp and a previous full update timestamp in a case that the resource information private copy is not updated for the first time.

Step S12. The scheduling server determines whether the time difference is greater than a preset full update threshold.

Step S13. The scheduling server performs screening to obtain first target host machine information meeting the VM information from the common resource information in a case that the time difference is greater than the full update threshold.

Step S14. The scheduling server copies the first target host machine information to the resource information private copy.

Step S15. The scheduling server sets the current timestamp to a first full update timestamp and a first incremental update timestamp.

Step S16. The scheduling server stores the first full update timestamp and the first incremental update timestamp to the resource information private copy.

Specifically, in step S11, the scheduling server obtains a time difference between a current timestamp and a previous full update timestamp in a case that the resource information private copy is not updated for the first time, where the previous full update timestamp is a full update timestamp previously recorded relative to the current timestamp.

Then, in step S12, the scheduling server determines whether the time difference is greater than a preset full update threshold. The full update threshold may be flexibly set according to actual requirements, and the specific value is not limited herein. For example, to achieve a relatively low full update frequency, the full update threshold may be set to a relatively large value.

In Step S13, the scheduling server performs screening to obtain first target host machine information meeting the VM information from the common resource information in a case that the time difference is greater than the full update threshold. To perform the full update, the scheduling server may perform step S14, that is, copy the first target host machine information to the resource information private copy. The current common resource information may alternatively be fully copied as the resource information private copy.

Then, in step S15, the scheduling server records the first full update timestamp and the first incremental update timestamp, to accurately record the full update timestamp and the incremental update timestamp. In some embodiments, the current timestamp may be set to the first full update timestamp and the first incremental update timestamp. For example, the current timestamp is 8:00 a.m. on Sep. 16, 2017, and in this case, the full update timestamp and the incremental update timestamp both are 8:00 a.m. on Sep. 16, 2017. Then, in step S16, the first full update timestamp and the first incremental update timestamp are stored into the resource information private copy, to complete the current update.

Further, after step S12 of determining whether the time difference is greater than a preset full update threshold, the scheduling server may perform step S17, that is, obtain updated host machine information of which an update timestamp is greater than a previous incremental update timestamp from the common resource information in a case that the time difference is less than or equal to the full update threshold.

In step S18, the scheduling server obtains second target host machine information meeting the VM information from the host machine information.

In step S19, the scheduling server adds the second target host machine information to the resource information private copy.

In step S20, the scheduling server sets the current timestamp to a second incremental update timestamp.

In step S21, the scheduling server stores the second incremental update timestamp to the resource information private copy.

A scale of the host machines in the cloud computing system is relatively large, for example, the scale of the host machines has an order of magnitude of 10000, and the scale of the scheduling servers has an order of magnitude of 100. Therefore, if the full update is performed, that is, the common resource information is fully copied as the resource information private copy each time the resource information private copy is updated, much time is consumed. To reduce time consumed by the update, the incremental update may be performed on the resource information, that is, part resource information of the common resource information is added to the resource information private copy.

Specifically, each time the host machine information in the common resource information is updated, the update timestamp is recorded, to obtain an accurate update time. After the scheduling server obtains the time difference between the current timestamp and the previous full update timestamp, if the time difference is less than or equal to the full update threshold, the scheduling server obtains updated host machine information from the common resource information and obtains the updated update timestamps of the host machine information, and then, performs screening to obtain, from the updated host machine information, the host machine information of which an update timestamp is greater than the previous incremental update timestamp. That is, the common resource information is queried according to the previous incremental update timestamp, to obtain all host machine information of which update timestamps are greater than or equal to the previous incremental update timestamp. The previous incremental update timestamp is a last incremental update timestamp relative to the current timestamp.

After the host machine information that is updated and of which an update timestamp is greater than the previous incremental update timestamp is obtained from the common resource information, the host machine information is screened. The second target host machine information meeting the VM information is obtained from the host machine information, and is added to the resource information private copy.

Then, the second incremental update timestamp is recorded, to accurately record the incremental update timestamp. That is, the current timestamp is set to the second incremental update timestamp, and the second incremental update timestamp is stored into the resource information private copy, to complete the current update. The resource information private copy is substantially a buffer run in the internal memory. In most cases, the scheduling server only needs to perform incremental update. The data volume and the consumed time of the update are both less. In some embodiments, the host machine that gets offline before the current incremental update is deleted from the resource information private copy.

The "first" and "second" in the first target host machine information, the second target host machine information, the first full update timestamp, the first incremental update timestamp, and the second incremental update timestamp are merely used for distinguishing the target host machine information, the incremental update timestamps, or the full update timestamps, and do not mean to limit their importance.

In step 104, the scheduling server obtains, according to the resource information private copy, at least one candidate host machine meeting the VM information.

After updating the resource information private copy, the scheduling server screens the host machines for the to-be-created VM based on the resource information private copy. The scheduling server may filter a set of the host machines in the resource information private copy according to the resource requirement in the VM information and the host machine information in the resource information private copy, reserve a qualified host machine, and remove an unqualified host machine, to obtain at least one candidate host machine.

In some embodiments, the scheduling server may control, according to the VM information and series-connected filters established based on the host machine information, each filter to perform corresponding filtering on the plurality of host machines, to obtain the at least one candidate host machine meeting the VM information.

In some embodiments, the scheduling server may deduct the resource requirement of the to-be-created VM from the candidate host machines, to obtain remaining resources of the candidate host machines, and submit the remaining resources to the common resource information until the remaining resource of one candidate host machine of the candidate host machines is successfully submitted. The scheduling server sets, in a case that the remaining resource corresponding to one candidate host machine of the candidate host machines is successfully submitted, the candidate host machine on which submission succeeds to the target host machine.

A series filtering model may be established according to the host machine information. The series filtering model includes a plurality of series-connected filters. Each filter is responsible for one filtering function, and makes a corresponding judgment according to the VM information and then performs the corresponding filtering. For example, a first series-connected filter is responsible for filtering out the host machine that does not meet the resource requirement according to the resource requirement such as a CPU resource, an internal memory resource, and a disk resource required by the VM, and only reserves the host machine meeting the resource requirement. A second series-connected filter is responsible for filtering out the host machine that supports or does not support the SSD. If the host machine is required to support the SSD in the resource requirement, the second filter filters out the host machine that does not support the SSD according to the resource requirement, and reserves the host machine supporting the SSD.

It may be understood that, for functions of other filters, reference may be made to the filter for understanding, except that other filters are responsible for other filtering functions. The functions of the filters in the specific filtering model may be set according to the resource requirement of the to-be-created VM, and the specific content is not limited herein.

In step 105, the scheduling server obtains a target host machine from the at least one candidate host machine, and creates the VM on the target host machine.

After obtaining the at least one candidate host machine, the scheduling server may determine the target host machine in the at least one candidate host machine. The target host machine may be randomly selected. Certainly, to select a most suitable target host machine, after the plurality of host machines are filtered to obtain at least one candidate host machine, priority values of each candidate host machine in respective dimensions may be determined, and the at least one candidate host machine is ranked according to the priority values.

In some embodiments, the step of obtaining the target host machine from the at least one candidate host machine may include the following steps:

Step S31. The scheduling server determines priority values of each host machine of the at least one candidate host machine in respective dimensions.

Step S32. The scheduling server performs ranking in descending order of the priority values in the dimensions, to generate a candidate host machine list.

Step S33. The scheduling server deducts a resource requirement of the to-be-created VM from candidate host machines one by one according to rankings of the candidate host machines in the candidate host machine list, to obtain remaining resources, the resource requirement being included in the VM information corresponding to the VM.

Step S34. The scheduling server submits the remaining resources to the common resource information.

Step S35. The scheduling server sets, in a case that the remaining resource corresponding to one candidate host machine is successfully submitted, the candidate host machine on which submission succeeds to the target host machine.

Specifically, the priority values of each host machine in the dimensions are first calculated. The priorities in the dimensions may include: a private network priority (vpcPrio), a concurrent task priority (taskPrio), a historical error priority (errorPrio), an anti-affinity priority (affinityPrio), an idleness priority (freePrio), an image cache priority (imgPrio), a fragmentation ratio priority (fragmentPrio), and the like.

For a value of the private network priority, a smaller value of the vpcPrio indicates a higher priority. The value of the private network priority may be determined for each host machine. For example, 0 may be assigned to the vpcPrio of the host machine supporting the private network, and 1 may be assigned to the vpcPrio of the host machine that does not support the private network; alternatively, 1 may be assigned to the vpcPrio of the host machine supporting the private network, and 0 may be assigned to the vpcPrio of the host machine that does not support the private network, and the like. For ease of description, in the embodiments of this application, an example in which 0 is assigned to the vpcPrio of the host machine supporting the private network, and 1 is assigned to the vpcPrio of the host machine that does not support the private network is used for description.

An IP address of the private network does not depend on a physical network topology, and is easier to migrate in future. The effect of the private network priority is preferentially placing the VM on the host machine that supports the private network, so that future migration is more convenient and flexible.

For the concurrent task priority, a smaller value of the taskPrio indicates a higher priority. A concurrent task priority may be determined for each host machine. The quantity of current tasks on the host machine is determined, and if the quantity of tasks is less than a preset threshold, 0 is assigned to the taskPrio; otherwise, the quantity of current tasks is assigned to the taskPrio. For example, the preset threshold of the quantity of concurrent tasks is 3 by default. Certainly, the preset threshold may be flexibly configured according to actual requirements.

The concurrent tasks on the host machine may be performed simultaneously, and the concurrency is excessively high. Therefore, the creation of the VM may be slow or even fail. The effect of the concurrent task priority is preferentially placing the VM on a host machine with a smaller quantity of concurrent tasks, to ensure the success rate and the real-time performance of creating the VM.

For the historical error priority, a smaller value of the errorPrio indicates a higher priority. A historical error priority may be calculated for each host machine. The quantity of historical errors of the host machine in a last period of time (for example, 24 hours by default) is determined. If the quantity of historical errors is less than an error threshold, 0 is assigned to the errorPrio; otherwise, the quantity of historical errors is assigned to the errorPrio. For example, the error threshold may be 5 by default, and the error threshold may be flexibly configured according to actual requirements.

A host machine in which a plurality of errors occur in a short period of time may suffer from some type of fault, and before the host machine is processed, if the VM continues to be placed on the host machine, the task of creating the VM may fail, and the success rate is reduced. The effect of the historical error priority is preferentially placing the VM on a host machine in which no excessive errors occur, thereby improving the success rate of creating the VM.

For the anti-affinity priority, a smaller value of the affinityPrio indicates a higher priority. An anti-affinity priority may be calculated for each host machine. The quantity of existing VMs of a VM user on the host machine is determined, and if the quantity of VMs is less than an affinity threshold, 0 is assigned to the affinityPrio; otherwise, the quantity of existing VMs is assigned to the affinityPrio. For example, the affinity threshold is 3, and certainly, the affinity threshold may be flexibly configured according to actual requirements.

In a large-scale distributed system, it is nearly impossible to completely avoid errors. If VMs of a user are clustered on one or more host machines the VMs on the host machines are all affected when the host machines are faulty, severely affecting the availability of the user's entire application. The effect of the anti-affinity priority is making VMs of a same user be widely distributed on different host machines, to perform distributed disaster recovery, so that a fault of a single host machine has a relatively limited impact on the availability of the entire application, thereby improving the stability and the availability of the user's application.

For the idleness priority, a smaller value of the freePrio indicates a higher priority. For example, whether each host machine is completely idle may be determined. If each host machine is completely idle, 0 is assigned to the freePrio; otherwise, 1 is assigned to the freePrio. Alternatively, if each host machine is completely idle, 1 is assigned to the freePrio; otherwise, 0 is assigned to the freePrio, and the like. For ease of description, in the embodiments of this application, an example in which if each host machine is completely idle, 0 is assigned to the freePrio; otherwise, 1 is assigned to the freePrio is used for description.

The effect of the idleness priority is protecting an idle host machine, and preferentially placing the VM on a non-idle host machine, to fully use resources on the non-idle host machine, thereby improving the resource utilization.

For the image cache priority, a smaller value of the imgPrio indicates a higher priority. The candidate host machine list may be traversed to determine whether each host machine has an image file required by the VM. For example, if each host machine has the image file, 0 is assigned to the imgPrio; otherwise, 1 is assigned to the imgPrio.

The effect of the image cache priority is preferentially placing the VM on a host machine that has stored a VM image, so that a step of image downloading may be omitted when the VM is actually produced, to reduce a production time, and improve the real-time performance of the VM production process.

For the fragmentation ratio priority, a smaller value of the fragmentPrio indicates a higher priority. A fragmentation ratio priority may be calculated for each host machine. The priority is calculated according to resources in two dimensions: CPU and internal memory. In a default case, the fragmentation ratio priority is equal to a fragmentation ratio of the CPU multiplied by a fragmentation ratio of the internal memory.

The effect of the fragmentation ratio priority is fully using the resources of the host machine to reduce the resource fragmentation ratio, to further improve the resource utilization and reduce the operational costs.

After the priority values of each candidate host machine in the dimensions are determined, the host machines are ranked in descending order of the priority values in the dimensions to obtain a candidate host machine list, and a most suitable candidate host machine in the candidate host machine list may be determined as the target host machine. A specific determining process may be as follows:

The host machines are ranked in descending order of the priority values in the same dimension based on the descending order of the priorities of the dimensions. Host machines with a same priority value in one dimension are ranked again according to respective priority values in a next dimension, thus obtaining the candidate host machine list in which the host machines are ranked in descending order of the priorities.

After the candidate host machines are ranked, the candidate host machine ranked first is optimal. Another creation task may exist in the optimal candidate host machine. Therefore, the success of the creation cannot be necessarily ensured, and the target host machine needs to be determined in a manner of simulating deduction of resources.

In the process of determining the target host machine, first, the resource requirement of the to-be-created VM is deducted from the candidate host machines one by one according to rankings of the ranked candidate host machines in the candidate host machine list, to obtain a remaining resource corresponding to each candidate host machine, thereby completing the simulation of deduction of resources on the host machine. The resource requirement of the VM is included in the VM information corresponding to the VM. That is, the resource requirement of the to-be-created VM is deducted one by one from the candidate host machines starting from the candidate host machine ranked first in descending order of the ranked candidate host machines. When the resource requirement is successfully deducted from a candidate host machine, the candidate host machine on which the deduction succeeds is used as the target host machine.

The ranking order may be preset. For example, a default ranking standard and a descending order of priorities may be: a private network priority (vpcPrio), a concurrent task priority (taskPrio), a historical error priority (errorPrio), an anti-affinity priority (affinityPrio), an idleness priority (freePrio), an image cache priority (imgPrio), and a fragmentation ratio priority (fragmentPrio). The ranking standard may also be selected in a default standard range, and the order may be adjusted and configured flexibly according to actual requirements.

Then, after the remaining resource of the candidate host machine is obtained, the remaining resource is submitted to the common resource information. In a case that the remaining resource corresponding to one candidate host machine is successfully submitted, the candidate host machine on which submission succeeds is set to the target host machine. Alternatively, the remaining resource of the candidate host machine is written to a database used for maintaining remaining resource data of each host machine. When the write succeeds, the candidate host machine on which the write succeeds is used as the target host machine.

After the target host machine is determined, the VM may be created on the target host machine. In some embodiments, because the creation of the VM needs to consume a resource of the target host machine, the host machine information in the resource information private copy may be updated, and the cloud computing system may be further instructed to update the common resource information. In a case that the remaining resource corresponding to the candidate host machine fails to be submitted, it indicates that a scheduling conflict possibly occurs, that is, a plurality of resource scheduling processes simultaneously select the same host machine. In this case, it is determined whether the quantity of submission times exceeds a quantity threshold. If not, the host machine information of the candidate host machine is obtained again, and the resource requirement of the to-be-created VM is deducted, to obtain the remaining resource again. Then, the remaining resource obtained again is submitted to the common resource information again. If the quantity of submission times exceeds the quantity threshold, a next candidate host machine is obtained from the candidate host machine list to perform the simulation of deduction of the resource.

When the deduction succeeds on the first host machine, the first host machine may be directly determined as the target host machine without performing the deduction operation on the second host machine. When the deduction is unsuccessful on the first host machine, the deduction operation needs to be performed on the second host machine until the deduction succeeds on a host machine.

Further, before the step of deducting the resource requirement of the to-be-created VM from candidate host machines one by one according to the rankings of the candidate host machines in the candidate host machine list, to obtain remaining resources, the method may further include: re-ranking a preset quantity of top candidate host machines in the candidate host machine list, to generate a candidate host machine target list.

The step of deducting the resource requirement of the to-be-created VM from candidate host machines one by one according to the rankings of the candidate host machines in the candidate host machine list, to obtain remaining resources includes: deducting the resource requirement of the to-be-created VM from candidate host machines in the candidate host machine target list one by one according to the rankings of the candidate host machines in the candidate host machine target list, to obtain remaining resources.

The preset quantity may be flexibly set according to actual requirements. The preset quantity of top candidate host machines in the candidate host machine list may be randomly re-ranked, or may be re-ranked according to a preset rule. The specific re-ranking manner is not limited herein. An objective of re-ranking the preset quantity of top candidate host machines in the candidate host machine list is to randomly scatter the first k (k is the preset quantity) candidate host machines in the candidate host machine list for re-ranking, and obtain the candidate host machine target list, so that a plurality of resource scheduling processes can be prevented from selecting the same target host machine in a concurrency scenario, effectively avoiding scheduling conflicts.

It can be seen from the foregoing that, in this embodiment of this application, VM information corresponding to a to-be-created VM is obtained and common resource information is obtained. The common resource information includes host machine information corresponding to all host machines in a cloud computing system. Then, a preset resource information private copy is updated according to the common resource information and the VM information. The resource information private copy includes host machine information corresponding to a preset host machine. Finally, according to the resource information private copy, at least one candidate host machine meeting the VM information is obtained, a target host machine is obtained from the at least one candidate host machine, and the VM is created on the target host machine. In the solution, the resource information private copy can be updated in time before the resource scheduling is performed, which ensures synchronization of the resource information private copy and the common resource information, so that a better resource scheduling result is achieved, and there is no need to wait during the resource scheduling, improving the efficiency of the resource scheduling.

According to the method described in the foregoing embodiment, the following further provides detailed descriptions by using an example.

A scheduler is used as an example. When there are a plurality of VM creation requests, a message corresponding to each VM creation request is stored in the message queue. A plurality of schedulers can concurrently extract the VM creation request from the message in the message queue, select a suitable host machine for each VM creation request according to the VM information carried in the VM creation request, and create a corresponding VM on the host machine. Because the plurality of schedulers concurrently perform resource scheduling, host machines may be selected for different VMs concurrently, so that the throughput and the concurrency capability of the cloud computing system can be improved, to prevent the scheduler from becoming a performance bottleneck of the entire system.

Figure 3:
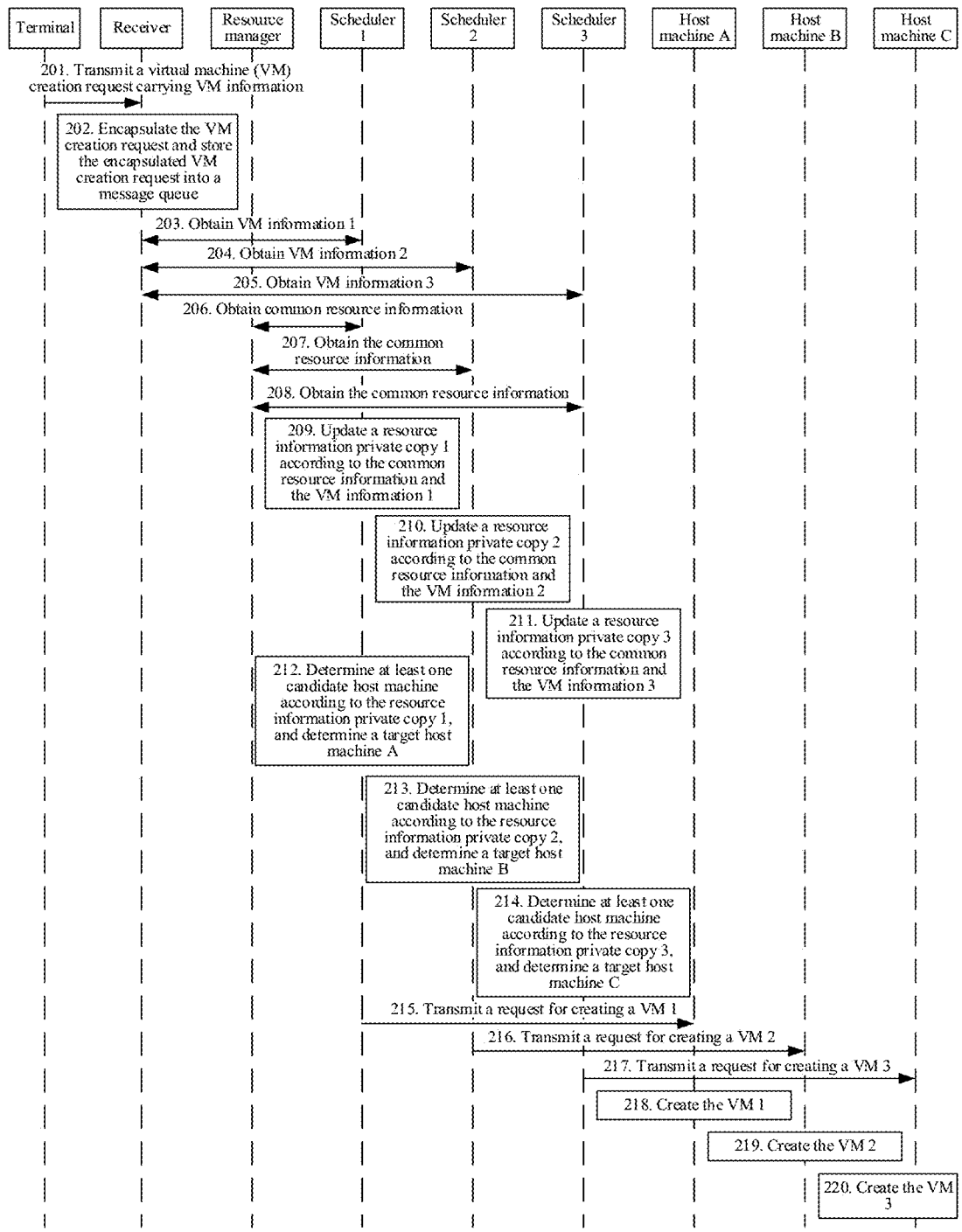
FIG. 3 is a schematic flowchart of a resource scheduling method according to an embodiment of this application.

FIG. 3 is a schematic flowchart of concurrently performing, by a plurality of schedulers, resource scheduling in a resource scheduling method according to an embodiment of this application. It is assumed that the cloud computing system has three schedulers and three host machines, and certainly, it is impossible that the cloud computing system only has three schedulers and three host machines. This embodiment is only for ease of describing a given example, but is not to be understood as limiting the quantity of schedulers and the quantity of host machines. However, regardless of the quantity of schedulers and the quantity of host machines, the resource scheduling processes are similar, and may all be understood according to the example.

The method process may include the following steps:

201. A terminal transmits a VM creation request carrying VM information to a receiver in the cloud computing system.

With continuous expansion of the scale of the data center of the cloud computing system, types and the quantity of host machines are increasing, and logic of resource scheduling is becoming more complex. With rapid growth of service requirements, a quantity of VM creation requests that need to be processed per unit of time increases rapidly, which further increases response latency of resource scheduling. To resolve the problems of high response latency and a low throughput rate of the conventional resource scheduling solution, a plurality of schedulers concurrently perform resource scheduling in this embodiment.

First, the terminal transmits the VM creation request carrying the VM information to the receiver in the cloud computing system. The terminal may be a terminal device used by a user responsible for creating the VM. The VM information is similar to the VM information described above, and is not described herein.

202. The receiver encapsulates the received VM creation request into a message, and stores the message into a message queue.

Figure 4:
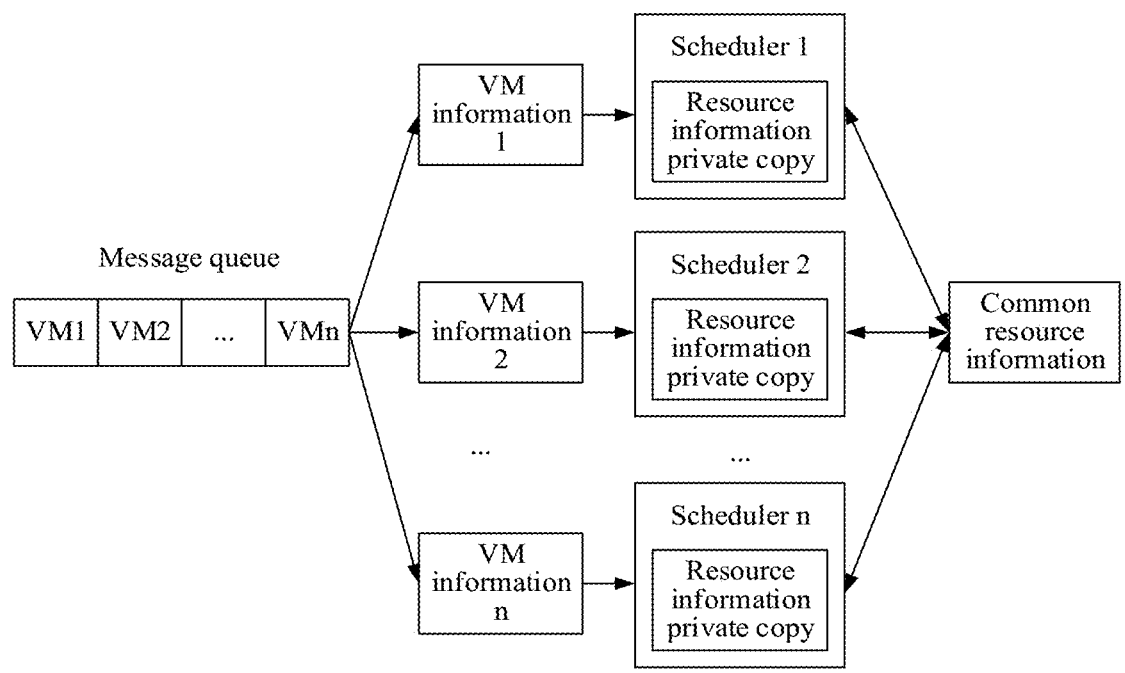
FIG. 4 is a schematic flowchart of a resource scheduling method according to an embodiment of this application.

The receiver maintains the message queue. After receiving the VM creation request, the receiver encapsulates the VM creation request into a message. A format of the message may be flexibly set according to actual requirements, for example, a key-value or json message format. Then, the receiver stores the message into the message queue, so that the scheduler may extract the VM information corresponding to the to-be-created VM from the message queue. When the receiver receives a large quantity of VM creation requests within a certain period of time, the message queue can store a plurality of messages. As shown in FIG. 4, the message queue stores a message VM1 to a message VMn in FIG. 4, where n is a positive integer and n>1.

203. A scheduler 1 obtains VM information 1.
204. A scheduler 2 obtains VM information 2.
205. A scheduler 3 obtains VM information 3.

Step 203 to step 205 may be performed simultaneously, or may be performed in order. Alternatively, step 205 may be first performed, then step 203 may be performed, and step 204 is finally performed. Alternatively, step 204 may be first performed, then step 205 may be performed, and step 203 is finally performed; or the like. The specific order of the steps is not limited herein.

As a component for performing resource scheduling, the scheduler selects a suitable host machine for the VM. If the scheduler is considered as a function black-box, its input may be the host machine information and the VM information, and its output may be a matching pair of a VM ID and a host machine ID, that is, <VM ID, HOST ID>.

The scheduler 1, the scheduler 2, and the scheduler 3 may concurrently perform resource scheduling, and respectively obtain the corresponding VM information, thereby improving a concurrency level and a throughput rate of the system.

The manner in which the scheduler 1 obtains the VM information 1 may include: Manner 1: The scheduler 1 transmits a request for obtaining the VM information 1 to the receiver, the receiver transmits a message 1 carrying the VM information 1 to the scheduler 1 according to the received request for obtaining the VM information 1, where the request is transmitted by the scheduler 1, and the scheduler 1 may extract the VM information 1 from the received message 1. Manner 2: The scheduler 1 directly reads the message stored in the message queue, and obtains the VM information 1 from the message.

The manner in which the scheduler 2 obtains the VM information 2 and the manner in which the scheduler 3 obtains the VM information 3 are similar to the manner in which the scheduler 1 obtains the VM information 1, and are not described herein.

206. The scheduler 1 obtains common resource information.

207. The scheduler 2 obtains the common resource information.

208. The scheduler 3 obtains the common resource information.

Step 206 to step 208 may be performed simultaneously, or may be performed in order. Alternatively, step 208 may be first performed, then step 206 may be performed, and step 207 is finally performed; or the like. The specific order of the steps is not limited herein.

The resource manager in the cloud computing system maintains the common resource information, and the common resource information includes the host machine information corresponding to all host machines in the cloud computing system. When the host machine enters the cloud computing system, necessary initialization needs to be performed through a host machine introducing process. The host machine reports its host machine information to the resource manager, and the resource manager may store the host machine information into the common resource information. When the host machine information is updated, the resource manager may also update the common resource information in time.

The manner in which the scheduler 1 obtains the common resource information may include the following manners: Manner 1: The scheduler 1 transmits a common resource information obtaining request to the resource manager, the resource manager transmits corresponding common resource information to the scheduler 1 according to the received common resource information obtaining request transmitted by the scheduler 1. Manner 2: The scheduler 1 directly reads a database storing the common resource information, and obtains the common resource information from the database.

The manner in which the scheduler 2 obtains the common resource information and the manner in which the scheduler 3 obtains the common resource information are similar to the manner in which the scheduler 1 obtains the common resource information, and are not described herein. The scheduler 1, the scheduler 2, and the scheduler 3 may obtain the common resource information concurrently or at a preset interval.

209. The scheduler 1 updates, according to the received common resource information and the VM information 1, a resource information private copy 1 maintained by itself.

210. The scheduler 2 updates, according to the received common resource information and the VM information 2, a resource information private copy 2 maintained by itself.

211. The scheduler 3 updates, according to the received common resource information and the VM information 3, a resource information private copy 3 maintained by itself.

The order in which step 209 to step 211 are performed may be flexibly set according to actual situations, and the specific order of the steps is not limited herein.

The scheduler 1 maintains the resource information private copy 1 by itself, the scheduler 2 maintains the resource information private copy 2 by itself, and the scheduler 3 maintains the resource information private copy 3 by itself. The resource information private copy 1, the resource information private copy 2, and the resource information private copy 3 each include host machine information corresponding to a preset host machine. The preset host machine may be some or all host machines of the host machines in the cloud computing system. The resource information private copy is updated through the common resource information, to ensure consistency of the resource information and accuracy of the information.

Figure 6:
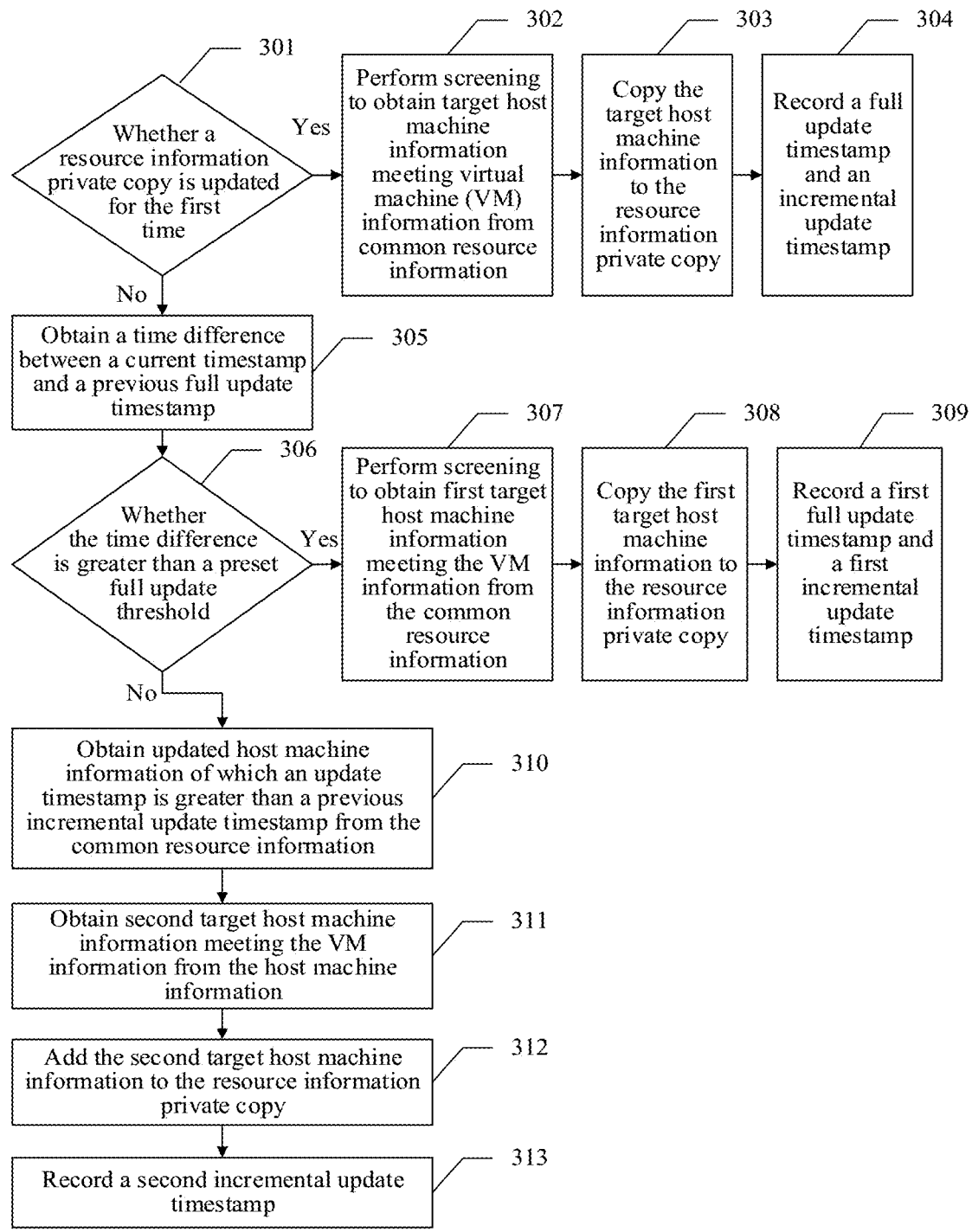
FIG. 6 is a schematic flowchart of updating a resource information private copy in a resource scheduling method according to an embodiment of this application.

Further, as shown in FIG. 6, the step of updating, by the scheduler 1, a resource information private copy 1 maintained by itself according to the received common resource information and the VM information 1 may include the following steps:

301. The scheduler 1 determines whether the resource information private copy is updated for the first time. If so, step 302 to step 304 are performed in order; and if not, step 305 is performed.

302. The scheduler 1 performs screening to obtain target host machine information meeting the VM information from the common resource information.

303. The scheduler 1 copies the target host machine information to the resource information private copy.

304. The scheduler 1 records a full update timestamp and an incremental update timestamp.

The scheduler 1 may obtain a current timestamp, and set the current timestamp to the full update timestamp and the incremental update timestamp; and stores the full update timestamp and the incremental update timestamp to the resource information private copy.

305. The scheduler 1 obtains a time difference between the current timestamp and a previous full update timestamp.

306. The scheduler 1 determines whether the time difference is greater than a preset full update threshold. If so, step 307 to step 309 are performed in order; and if not, step 310 is performed.

307. The scheduler 1 performs screening to obtain first target host machine information meeting the VM information from the common resource information.

308. The scheduler 1 copies the first target host machine information to the resource information private copy.

309. The scheduler 1 records a first full update timestamp and a first incremental update timestamp.

The scheduler 1 may set the current timestamp to the first full update timestamp and the first incremental update timestamp; and stores the first full update timestamp and the first incremental update timestamp to the resource information private copy.

310. The scheduler 1 obtains updated host machine information of which an update timestamp is greater than a previous incremental update timestamp from the common resource information.

311. The scheduler 1 obtains second target host machine information meeting the VM information from the host machine information.

312. The scheduler 1 adds the second target host machine information to the resource information private copy.

313. The scheduler 1 records a second incremental update timestamp.

The scheduler 1 may set the current timestamp to the second incremental update timestamp; and stores the second incremental update timestamp to the resource information private copy. In a buffering mechanism of resource information synchronization, incremental update may be performed on the resource information private copy, to significantly reduce time consumed by resource information synchronization.

The scheduler 2 updates the resource information private copy 2 according to the common resource information and the VM information 2, and the scheduler 3 updates the resource information private copy 3 according to the common resource information and the VM information 3. The update manners of the scheduler 2 and the scheduler 3 are similar to the update manner of the scheduler 1, and are not described herein.

As shown in FIG. 4, when a quantity of schedulers is not limited, n (n is a positive integer greater than 1) schedulers may concurrently extract the VM information from the messages in the message queue, and respectively update, according to the common resource information, the resource information private copies maintained by the schedulers.

212. The scheduler 1 determines at least one candidate host machine according to the resource information private copy 1, and determines a target host machine A in the at least one candidate host machine.

213. The scheduler 2 determines at least one candidate host machine according to the resource information private copy 2, and determines a target host machine B in the at least one candidate host machine.

214. The scheduler 3 determines at least one candidate host machine according to the resource information private copy 3, and determines a target host machine C in the at least one candidate host machine.

The order in which step 212 to step 214 are performed may be flexibly set according to actual situations, and the specific order of the steps is not limited herein.

The scheduler 1 may filter a set of the host machines in the resource information private copy according to the resource requirement in the VM information and the host machine information in the resource information private copy, reserve a qualified host machine, and remove an unqualified host machine, to obtain at least one candidate host machine.

In some embodiments, the scheduler 1 may control, according to established series-connected filters, each filter to perform corresponding filtering on the plurality of host machines, to obtain the at least one candidate host machine meeting the VM information. Eight host machines are used as an example. The eight host machines are filtered according to the host machine information and the VM information of the to-be-created VM. When the host machines pass through a filter A and the filter A is responsible for filtering out host machines that do not meet the hardware resource requirements that can be provided by the host machines, such as the CPU resources, the internal memory resources, and the disk resources required by the VM, to reserve host machines that meet the resource requirements, two host machines are filtered out through the round of filtering. The remaining six host machines then enter a filter B. If the filter B is responsible for filtering out the host machine that does not support the SSD according to the VM information, one more host machine is filtered out after the filtering performed by the filter B, and five host machines remain. Then, the five host machines sequentially pass through other filters. The other filters may be responsible for filtering out a host machine that does not support the cloud disk, and responsible for filtering out a host machine that does not support a private network, or the like. Finally, if the remaining host machines reach a filter X, the filter X is responsible for filtering out one host machine that does not meet the virtualization type, for example, if the virtualization type of the host machine needs to be KVM, a host machine whose virtualization type is Xen is filtered out. After the filtering ends, three candidate host machines are obtained, that is, a candidate host machine A, a candidate host machine B, and a candidate host machine C.

Figure 7:
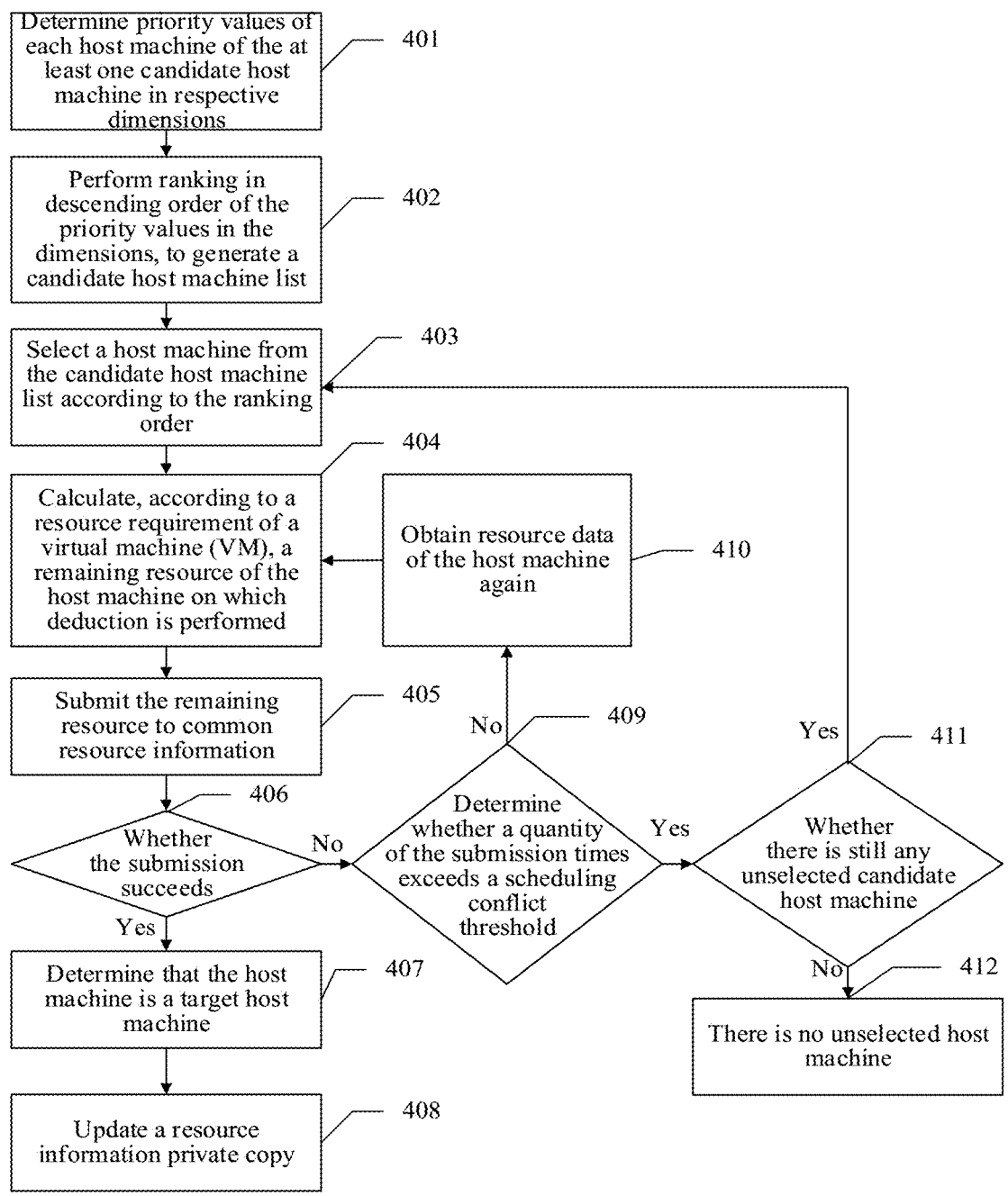
FIG. 7 is a schematic flowchart of obtaining a target host machine in a resource scheduling method according to an embodiment of this application.

Further, as shown in FIG. 7, after obtaining the at least one candidate host machine, the scheduler 1 may determine the target host machine in the at least one candidate host machine, and specific execution steps may include the following steps:

401. The scheduler 1 determines priority values of each host machine of the at least one candidate host machine in respective dimensions.

The manner of calculating the priority values of each host machine in the dimensions is similar to the manner of calculating the priority values described in the foregoing embodiment, and is not described herein.

For example, when three obtained candidate host machines are the candidate host machine A, the candidate host machine B, and the candidate host machine C, the priority values of the candidate host machine A, the candidate host machine B, and the candidate host machine C in the dimensions may be separately calculated.

402. The scheduler 1 performs ranking in descending order of the priority values in the dimensions, to generate a candidate host machine list.

The ranking manner is similar to the ranking manner described in the foregoing embodiment, and is not described herein.

For example, in a candidate host machine list 1 generated by the scheduler 1, the candidate host machines are ranked as the candidate host machine A, the candidate host machine B, and the candidate host machine C sequentially in descending order of the priority values.

403. The scheduler 1 selects a host machine from the candidate host machine list according to the ranking order.

For example, the scheduler 1 selects the candidate host machine A from the generated candidate host machine list 1.

404. The scheduler 1 calculates, according to a resource requirement of the VM, a remaining resource of the host machine on which deduction is performed.

For example, the resource requirement of the VM is resources of 8-core and 8G, the host machine information of the candidate host machine A includes resources of 10-core and 10G, resources of 8-core and 8G need to be deducted for creating the VM, so that remaining resources of the candidate host machine A after the deduction are resources of 2-core and 2G.

405. The scheduler 1 submits the remaining resource to common resource information.

406. The scheduler 1 determines whether the submission succeeds. If so, step 407 and step 408 are performed in order; and if not, step 409 is performed.

407. The scheduler 1 determines that the host machine is the target host machine.

If the submission succeeds, it indicates that modification to the value of the remaining resource in the common resource information succeeds. The scheduler 1 sets, in a case that the remaining resource corresponding to one candidate host machine is successfully submitted, the candidate host machine on which submission succeeds to the target host machine.

408. The scheduler 1 updates the resource information private copy.

That is, the scheduler 1 updates the resource information private copy 1.

409. The scheduler 1 determines whether a quantity of submission times exceeds a scheduling conflict threshold. If not, step 410 is performed; and if yes, step 411 is performed.

If the submission succeeds, the reason may be that a plurality of schedulers attempt to concurrently submit the resources to the same host machine. In this case, only one scheduler can successfully submit the resources, and other schedulers fail to submit the resources.

The scheduling conflict threshold may be flexibly set according to actual situations. In some embodiments, the scheduling conflict threshold may be set in a range of three times to eight times, so as to avoid the case that a plurality of VMs are created on the same host machine in a short time, to cause excessively great pressure on the host machine.

410. The scheduler 1 obtains resource data of the host machine again, and performs step 404.

The scheduling conflict may occur when a plurality of schedulers concurrently operate to submit the remaining resource. Therefore, the scheduler may query for latest resource data of the host machine, and initiate a new round of operations such as deduction and submission of remaining resources. If a quantity of scheduling conflicts for the same host machine exceeds the threshold, a next host machine in the candidate host machine list is selected, that is, a suboptimal host machine. In this way, the cost of the scheduling conflict is lower and the scheduling conflict is effectively handled.

411. The scheduler 1 determines whether there is still any unselected candidate host machine. If so, step 403 is performed; and if not, step 412 is performed.

The scheduler 1 may re-rank the preset quantity of top candidate host machines in the candidate host machine list to obtain the candidate host machine target list, select the host machine according to the rankings of the candidate host machines in the candidate host machine target list, and calculate the remaining resource of the host machine after deduction according to the resource requirement of the VM, so that a plurality of schedulers can be prevented from selecting the same host machine in a scenario in which resource scheduling is performed concurrently, effectively avoiding scheduling conflicts.

In some embodiments, the scheduling server may determine, in a case of failing to submit the remaining resource of a candidate host machine, whether a quantity of submission times of the remaining resource of the candidate host machine exceeds the scheduling conflict threshold.

The scheduling server obtains latest resource data of the candidate host machine, and re-determines the remaining resource corresponding to the candidate host machine in a case of determining that the quantity of submission times of the remaining resource of the candidate host machine does not exceed the scheduling conflict threshold.

The scheduling server may deduct the resource requirement of the to-be-created VM from a next candidate host machine in the candidate host machine list to obtain a corresponding remaining resource, and submit the corresponding remaining resource in a case of determining that the quantity of submission times of the remaining resource of the candidate host machine exceeds the scheduling conflict threshold.

412. The scheduler 1 determines that there is no unselected host machine.

The scheduler 2 determines at least one candidate host machine according to the resource information private copy 2, and determines the target host machine B in the at least one candidate host machine. The scheduler 3 determines at least one candidate host machine according to the resource information private copy 3, and determines the target host machine C in the at least one candidate host machine. The determining manners of the two schedulers are similar to that of the scheduler 1, and are not described herein.

219. The scheduler 1 transmits a request for creating a VM 1 to the host machine A after determining the target host machine A.

220. The scheduler 2 transmits a request for creating a VM 2 to the host machine B after determining the target host machine B.

221. The scheduler 3 transmits a request for creating a VM 3 to the host machine C after determining the target host machine C.

222. The host machine A creates the VM 1 after receiving the request for creating the VM 1.

223. The host machine B creates the VM 2 after receiving the request for creating the VM 2.

224. The host machine C creates the VM 3 after receiving the request for creating the VM 3.

Figure 5:
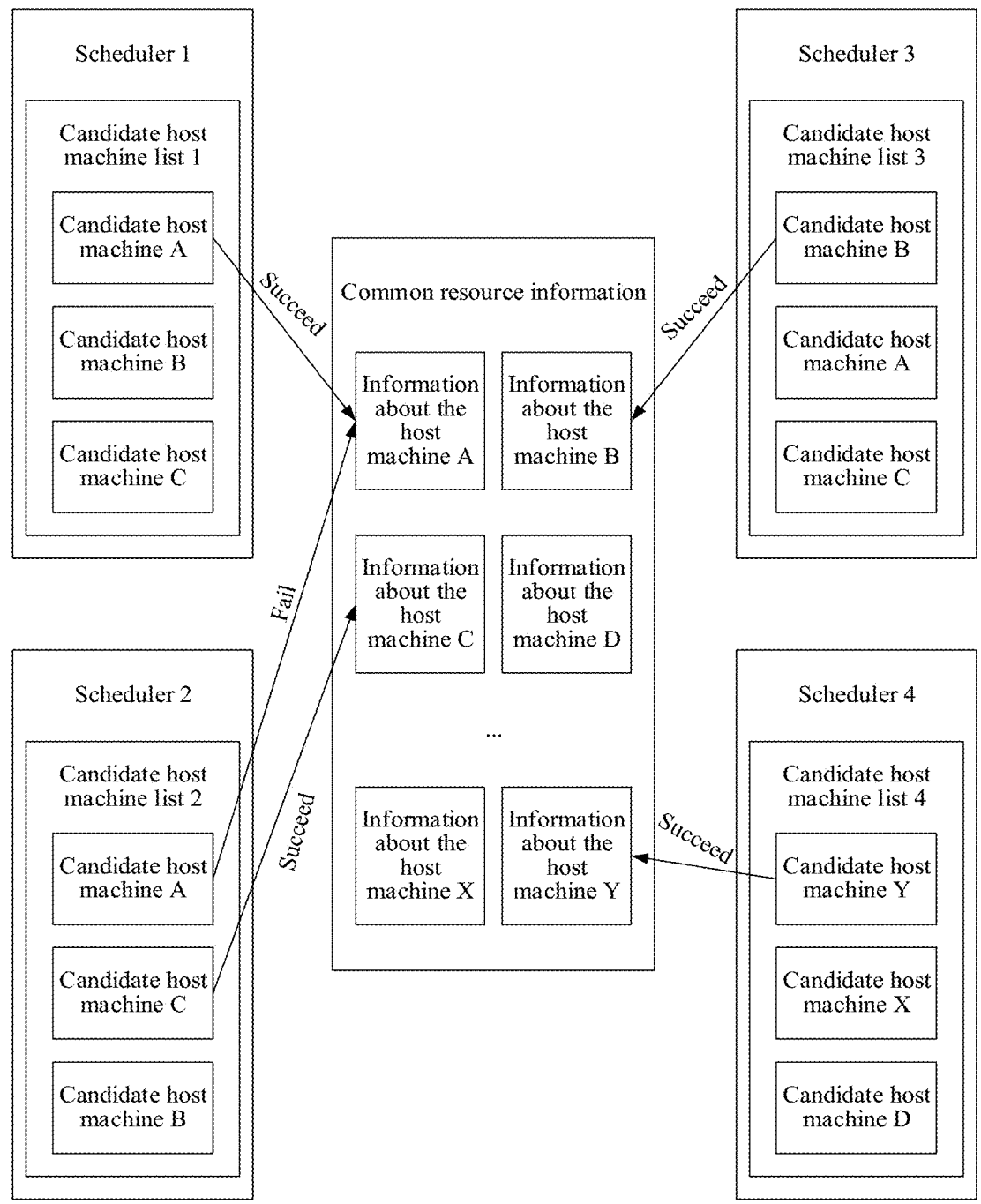
FIG. 5 is a schematic flowchart of a resource scheduling method according to an embodiment of this application.

Examples are used in the following for description. As shown in FIG. 5, assuming that schedulers concurrently perform resource scheduling, candidate host machines are sequentially a candidate host machine A, a candidate host machine B, and a candidate host machine C in descending order of priority values in a candidate host machine list 1 obtained by a scheduler 1; candidate host machines are sequentially a candidate host machine A, a candidate host machine C, and a candidate host machine B in descending order of priority values in a candidate host machine list 2 obtained by a scheduler 2; and candidate host machines are sequentially a candidate host machine B, a candidate host machine A, and a candidate host machine C in descending order of priority values in a candidate host machine list 3 obtained by a scheduler 3.

In this case, the scheduler 1 selects the candidate host machine A ranked first from the candidate host machine list 1, calculates a remaining resource of the candidate host machine A according to a resource requirement of the VM 1 after deduction is performed, and submits the remaining resource to the common resource information, so that it may be determined that the candidate host machine A is the target host machine if the submission succeeds. The scheduler 1 transmits the request for creating the VM 1 to the host machine A, and the host machine A creates the VM 1 after receiving the request.

The scheduler 2 selects the candidate host machine A ranked first from the candidate host machine list 2, calculates a remaining resource of the candidate host machine A according to a resource requirement of the VM 2 after deduction is performed, and submits the remaining resource to the common resource information. If the submission fails and the quantity of submission times reaches the threshold, the scheduler 2 needs to select the candidate host machine C ranked second from the candidate host machine list 2, calculates the remaining resource of the candidate host machine C according to the resource requirement of the VM 2 after deduction is performed, and submits the remaining resource to the common resource information, so that it may be determined that the candidate host machine C is the target host machine if the submission succeeds. The scheduler 2 transmits the request for creating the VM 2 to the host machine C, and the host machine C creates the VM 2 after receiving the request.

The scheduler 3 selects the candidate host machine B ranked first from the candidate host machine list 3, calculates a remaining resource of the candidate host machine A according to a resource requirement of the VM 3 after deduction is performed, and submits the remaining resource to the common resource information, so that it may be determined that the candidate host machine B is the target host machine if the submission succeeds. The scheduler 3 transmits the request for creating the VM 3 to the host machine B, and the host machine B creates the VM 3 after receiving the request.

FIG. 5 is merely an example. The resource scheduling scenario described in FIG. 5 is for more clearly describing the technical solutions of the embodiments of this application, and does not constitute a limitation on the technical solutions provided in the embodiments of this application. For example, FIG. 5 may further include a scheduler 4, candidate host machines are sequentially a candidate host machine Y, a candidate host machine X, and a candidate host machine D in descending order of priority values in a candidate host machine list 4 obtained by the scheduler 4. The scheduler 4 selects the candidate host machine Y ranked first from the candidate host machine list 4, calculates a remaining resource of the candidate host machine Y according to a resource requirement of the VM 4 after deduction is performed, and submits the remaining resource to the common resource information, so that it may be determined that the scheduler 4 may create the VM 4 on the candidate host machine Y if the submission succeeds.

It can be seen from the foregoing that, in this embodiment, a plurality of schedulers can concurrently extract the VM creation request from the message in the message queue, select a suitable target host machine for each VM creation request according to the VM information carried in the VM creation request, and create a corresponding VM on the target host machine. By setting a buffering mechanism for resource information, including setting the common resource information and the resource information private copy, a plurality of schedulers can concurrently perform resource scheduling, which can effectively improve a concurrency level and a throughput rate of resource scheduling, reduce scheduling latency, and improve scalability of an entire system.

To better implement the resource scheduling method provided in the embodiments of this application, an embodiment of this application further provides an apparatus based on the foregoing resource scheduling method. Terms have meanings the same as those in the foregoing resource scheduling method, and for specific implementation details, reference may be made to the description in the method embodiments.

Figure 8:
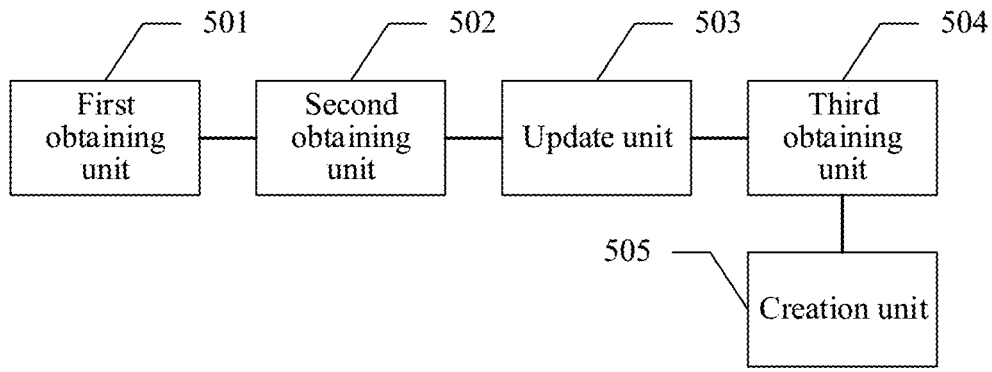
FIG. 8 is a schematic structural diagram of a resource scheduling apparatus according to an embodiment of this application.

FIG. 8 is a schematic structural diagram of a resource scheduling apparatus according to an embodiment of this application. The resource scheduling apparatus may include a first obtaining unit 501, a second obtaining unit 502, an update unit 503, a third obtaining unit 504, and a creation unit 505.

The first obtaining unit 501 is configured to obtain VM information corresponding to a to-be-created VM.

For example, the first obtaining unit 501 may obtain the VM information corresponding to the to-be-created VM from a preset message queue in a cloud computing system. The VM is an entire computer system that is simulated through software, has a hardware system function and is run in an isolated environment.

A message in the message queue may be an asynchronous task, a message in the message queue flows in the message queue, and each component in the cloud computing system has an identity of a producer or a consumer. The producer transmits a message to the message queue, and the consumer receives a message from the message queue. For example, a receiver is used as a producer in the cloud computing system. After receiving a VM creation request carrying the VM information sent by a terminal, the receiver encapsulates the VM information into a message, and stores the message into the message queue. The VM information is queued in the message queue to wait for the first obtaining unit 501 to perform resource scheduling. As a consumer, the first obtaining unit 501 extracts the VM information from the message queue, and selects a host machine for the to-be-created VM corresponding to the VM information.

The VM information may include processor information, internal memory information, and disk information required by the to-be-created VM, and at least one of resource requirements of the to-be-created VM for a solid state drive, a cloud disk, a private network, a network adapter, a router, a network structure, a data center, a rack, a type of a host machine, a resource pool to which a host machine belongs, and a type of a VM. It may be understood that, the type of the VM information may be flexibly set according to actual requirements, and the specific content is not limited herein.

The second obtaining unit 502 is configured to obtain common resource information.

The common resource information is resource data of the entire data center stored and maintained by the cloud computing system. The common resource information includes host machine information corresponding to all host machines in the cloud computing system. It may be understood that, the common resource information may be maintained by a resource manager, or may be maintained by another device in the cloud computing system. Then, the second obtaining unit 502 obtains the common resource information from the device maintaining the common resource information. For example, if the common resource information is maintained by the resource manager in the cloud computing system, the second obtaining unit 502 may obtain the common resource information from the resource manager. For ease of description, in embodiments of this application, the resource manager maintaining the common resource information is used as an example for description.

The common resource information is globally unique in the cloud computing system, and may be maintained in a form of a logic data table. For example, each row in the data table represents a host machine, and columns in the data table represent different types of resources included in the host machine. The different types of resources may include an Internet protocol (IP) address of the host machine, an available central processing unit (CPU), an available internal memory, and an available disk. In the maintenance process, an operation such as adding, reading, updating, or deleting may be performed on the common resource information. The operation corresponds to a process such as getting online, changing, or getting offline of a host machine resource in the data center.

A host machine is a physical computer configured to install VM software. One or more VMs may be created on one host machine through the VM software.

In some embodiments, the host machine information may include a host machine identifier, an IP address, a machine type, an operating system name, a kernel version, a CPU type, a virtualization manner, a logical area number, an Internet data center number, a state of the host machine, whether to support a cloud disk, whether to support a solid state drive (SSD), a network version, a CPU node resource quota, an available internal memory resource, and an available disk resource, and the specific content is not limited herein.

When the host machine enters the cloud computing system, necessary initialization needs to be performed through a host machine introducing process. The host machine reports its host machine information to the resource manager, and the resource manager may store the host machine information into the common resource information. The host machine may report the host machine information to the resource scheduling apparatus, and the resource scheduling apparatus may store the host machine information into a preset resource information private copy. Alternatively, the resource scheduling apparatus transmits an information obtaining request to the resource manager in real time or at a preset interval, receives the common resource information fed back by the resource manager based on the information obtaining request, and updates the resource information private copy according to the common resource information. Alternatively, the resource manager actively transmits the updated host machine information to the resource scheduling apparatus in a case that the common resource information is updated.

The update unit 503 is configured to update the preset resource information private copy according to the common resource information and the VM information.

The resource scheduling apparatus maintains a resource information private copy in a form of a buffer that is of the common resource information in an internal memory of the resource scheduling apparatus. The resource information private copy includes host machine information corresponding to a preset host machine. The preset host machine may be some or all host machines of the host machines in the cloud computing system. To achieve a better resource scheduling result, before performing the resource scheduling, the update unit 503 needs to synchronize the resource information private copy with the common resource information, and may obtain the common resource information and update the resource information private copy according to the common resource information, to ensure consistency between the resource information private copy and the common resource information.

Figure 9:
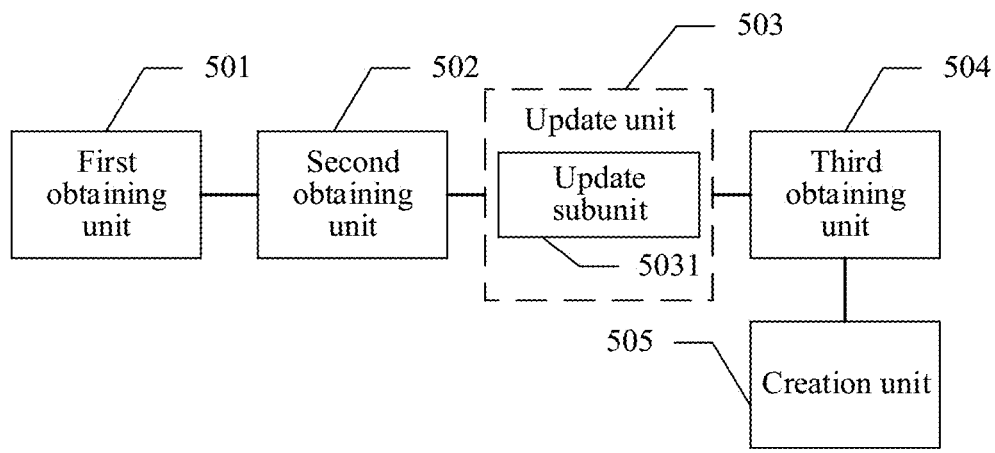
FIG. 9 is a schematic structural diagram of a resource scheduling apparatus according to an embodiment of this application.

To reduce update time, the update unit 503 may update the resource information private copy according to the common resource information and the VM information. In some embodiments, as shown in FIG. 9, the update unit 503 includes an update subunit 5031, configured to perform screening to obtain target host machine information meeting the VM information from the common resource information, and add the target host machine information to the preset resource information private copy.

In some embodiments, the update subunit 5031 is specifically configured to: perform screening to obtain the target host machine information meeting the VM information from the common resource information in a case that the resource information private copy is updated for the first time; copy the target host machine information to the resource information private copy; obtain a current timestamp, and set the current timestamp to a full update timestamp and an incremental update timestamp; and store the full update timestamp and the incremental update timestamp into the resource information private copy.

Specifically, first, the update subunit 5031 determines whether the resource information private copy is updated for the first time, for example, may determine whether the resource information private copy is empty. If so, it is determined that the resource information private copy is updated for the first time; and if not, it is determined that the resource information private copy is not updated for the first time. In a case that the resource information private copy is updated for the first time, the current resource information private copy is empty, and in this case, full update needs to be performed, that is, performing screening to obtain target host machine information meeting the VM information from the common resource information, and copying the target host machine information to the resource information private copy. The common resource information may alternatively be directly fully copied as the resource information private copy.

After the target host machine information is copied to the resource information private copy, a full update timestamp and an incremental update timestamp need to be recorded. In some embodiments, the update subunit 5031 obtains a current timestamp, and sets the current timestamp as the full update timestamp and the incremental update timestamp. For example, the current timestamp is 11:00 a.m. on Sep. 15, 2017, and in this case, the full update timestamp and the incremental update timestamp both are 11:00 a.m. on Sep. 15, 2017. Then, the full update timestamp and the incremental update timestamp are stored into the resource information private copy, to complete the current update.

In some embodiments, the update subunit 5031 is specifically configured to: obtain a time difference between the current timestamp and a previous full update timestamp in a case that the resource information private copy is not updated for the first time; determine whether the time difference is greater than a preset full update threshold; perform screening to obtain first target host machine information meeting the VM information from the common resource information in a case that the time difference is greater than the full update threshold; copy the first target host machine information to the resource information private copy; set the current timestamp to a first full update timestamp and a first incremental update timestamp; and store the first full update timestamp and the first incremental update timestamp into the resource information private copy.

Specifically, the update subunit 5031 obtains the time difference between the current timestamp and the previous full update timestamp in a case that the resource information private copy is not updated for the first time, where the previous full update timestamp is a full update timestamp previously recorded relative to the current timestamp.

Then, the update subunit 5031 determines whether the time difference is greater than a preset full update threshold. The full update threshold may be flexibly set according to actual requirements, and the specific value is not limited herein. For example, to achieve a relatively low full update frequency, the full update threshold may be set to a relatively large value.

If the time difference is greater than the full update threshold, full update is performed, that is, performing screening to obtain the first target host machine information meeting the VM information from the common resource information, and copying the first target host machine information to the resource information private copy. The current common resource information may alternatively be fully copied as the resource information private copy.

Then, the update subunit 5031 records the first full update timestamp and the first incremental update timestamp, to accurately record the full update timestamp and the incremental update timestamp. In some embodiments, the current timestamp may be set to the first full update timestamp and the first incremental update timestamp. For example, the current timestamp is 8:00 a.m. on Sep. 16, 2017, and in this case, the full update timestamp and the incremental update timestamp both are 8:00 a.m. on Sep. 16, 2017. Then, the first full update timestamp and the first incremental update timestamp are stored into the resource information private copy, to complete the current update.

Further, the update subunit 5031 is further specifically configured to: obtain updated host machine information of which an update timestamp is greater than a previous incremental update timestamp from the common resource information in a case that the time difference is less than or equal to the full update threshold; obtain second target host machine information meeting the VM information from the host machine information; add the second target host machine information to the resource information private copy; set the current timestamp to a second incremental update timestamp; and store the second incremental update timestamp into the resource information private copy.

A scale of the host machines in the cloud computing system is relatively large, for example, the scale of the host machines has an order of magnitude of 10000, and the scale of the resource scheduling apparatuses has an order of magnitude of 100. Therefore, if the full update is performed, that is, the common resource information is fully copied as the resource information private copy each time the resource information private copy is updated, much time is consumed. To reduce time consumed by the update, the incremental update may be performed on the resource information, that is, part resource information of the common resource information is added to the resource information private copy.

Specifically, each time the host machine information in the common resource information is updated, the update timestamp is recorded, to obtain an accurate update time. After the update subunit 5031 obtains the time difference between the current timestamp and the previous full update timestamp, if the time difference is less than or equal to the full update threshold, the update subunit 5031 obtains updated host machine information from the common resource information and obtains the updated update timestamps of the host machine information, and then, performs screening to obtain, from the updated host machine information, the host machine information of which an update timestamp is greater than the previous incremental update timestamp. That is, the common resource information is queried according to the previous incremental update timestamp, to obtain all host machine information of which update timestamps are greater than or equal to the previous incremental update timestamp. The previous incremental update timestamp is a last incremental update timestamp relative to the current timestamp.

After the host machine information that is updated and of which an update timestamp is greater than the previous incremental update timestamp is obtained from the common resource information, the host machine information is screened. The second target host machine information meeting the VM information is obtained from the host machine information, and is added to the resource information private copy.

Then, the update subunit 5031 records the second incremental update timestamp, to accurately record the incremental update timestamp. That is, the current timestamp is set to the second incremental update timestamp, and the second incremental update timestamp is stored into the resource information private copy, to complete the current update. The resource information private copy is substantially a buffer run in the internal memory. In most cases, the update subunit 5031 only needs to perform incremental update. The data volume and the consumed time of the update are both less. In some embodiments, the host machine that gets offline before the current incremental update is deleted from the resource information private copy.

The "first" and "second" in the first target host machine information, the second target host machine information, the first full update timestamp, the first incremental update timestamp, and the second incremental update timestamp are merely used for distinguishing the target host machine information, the incremental update timestamps, or the full update timestamps, and do not mean to limit their importance.

The third obtaining unit 504 is configured to obtain, according to the resource information private copy, at least one candidate host machine meeting the VM information.

After updating the resource information private copy, the third obtaining unit 504 screens the host machines for the to-be-created VM based on the resource information private copy. The third obtaining unit 504 may filter a set of the host machines in the resource information private copy according to the resource requirement in the VM information and the host machine information in the resource information private copy, reserve a qualified host machine, and remove an unqualified host machine, to obtain at least one candidate host machine.

In some embodiments, the third obtaining unit 504 may control, according to the VM information and series-connected filters established based on the host machine information, each filter to perform corresponding filtering on the plurality of host machines, to obtain the at least one candidate host machine meeting the VM information.

A series filtering model may be established according to the host machine information. The series filtering model includes a plurality of series-connected filters. Each filter is responsible for one filtering function, and makes a corresponding judgment according to the VM information and then performs the corresponding filtering. For example, a first series-connected filter is responsible for filtering out the host machine that does not meet the resource requirement according to the resource requirement such as a CPU resource, an internal memory resource, and a disk resource required by the VM, and only reserves the host machine meeting the resource requirement. A second series-connected filter is responsible for filtering out the host machine that supports or does not support the SSD. If the host machine is required to support the SSD in the resource requirement, the second filter filters out the host machine that does not support the SSD according to the resource requirement, and reserves the host machine supporting the SSD.

It may be understood that, for functions of other filters, reference may be made to the filter for understanding, except that other filters are responsible for other filtering functions. The functions of the filters in the specific filtering model may be set according to the resource requirement of the to-be-created VM, and the specific content is not limited herein.

The creation unit 505 is configured to obtain a target host machine from the at least one candidate host machine, and create the VM on the target host machine.

After obtaining the at least one candidate host machine, the creation unit 505 may determine the target host machine in the at least one candidate host machine. The target host machine may be randomly selected. Certainly, to select a most suitable target host machine, after the plurality of host machines are filtered to obtain at least one candidate host machine, priority values of each candidate host machine in respective dimensions may be determined, and the at least one candidate host machine is ranked according to the priority values.

Figure 10:
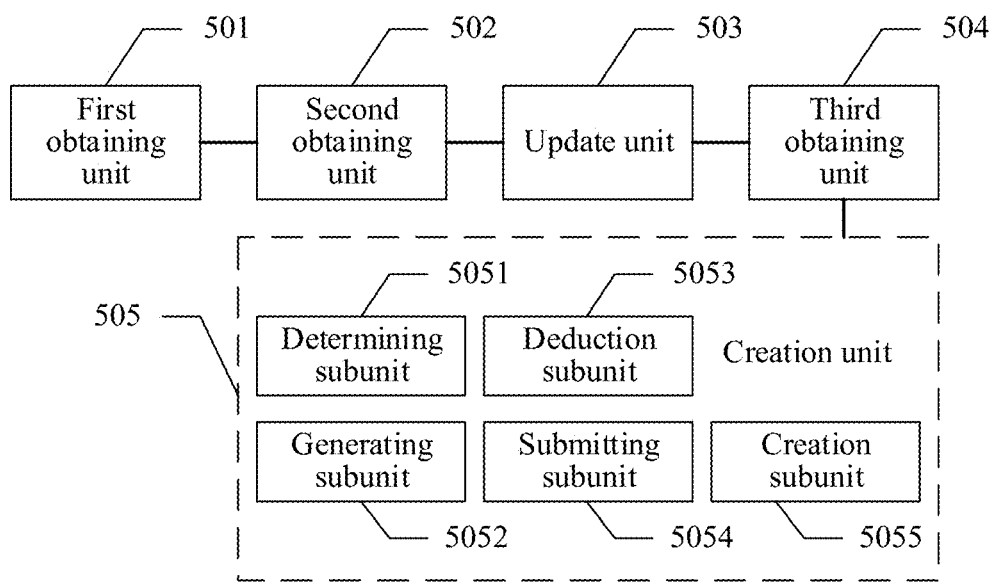
FIG. 10 is a schematic structural diagram of a resource scheduling apparatus according to an embodiment of this application.

In some embodiments, as shown in FIG. 10, the creation unit 505 includes:

a determining subunit 5051, configured to determine priority values of each host machine of the at least one candidate host machine in respective dimensions;

a generating subunit 5052, configured to perform ranking in descending order of the priority values in the dimensions, to generate a candidate host machine list;

a deduction subunit 5053, configured to deduct a resource requirement of the to-be-created VM from candidate host machines one by one according to rankings of the candidate host machines in the candidate host machine list, to obtain remaining resources, the resource requirement being included in the VM information corresponding to the VM;

a submitting subunit 5054, configured to submit the remaining resources to the common resource information; and a creation subunit 5055, configured to set, in a case that the remaining resource corresponding to one candidate host machine is successfully submitted, the candidate host machine on which submission succeeds to the target host machine, and create the VM on the target host machine.

Specifically, first, the determining subunit 5051 calculates the priority values of each host machine in the dimensions. The priorities in the dimensions may include: a private network priority (vpcPrio), a concurrent task priority (taskPrio), a historical error priority (errorPrio), an anti-affinity priority (affinityPrio), an idleness priority (freePrio), an image cache priority (imgPrio), a fragmentation ratio priority (fragmentPrio), and the like.

For a value of the private network priority, a smaller value of the vpcPrio indicates a higher priority. The value of the private network priority may be determined for each host machine. For example, 0 may be assigned to the vpcPrio of the host machine supporting the private network, and 1 may be assigned to the vpcPrio of the host machine that does not support the private network; alternatively, 1 may be assigned to the vpcPrio of the host machine supporting the private network, and 0 may be assigned to the vpcPrio of the host machine that does not support the private network, and the like. For ease of description, in the embodiments of this application, an example in which 0 is assigned to the vpcPrio of the host machine supporting the private network, and 1 is assigned to the vpcPrio of the host machine that does not support the private network is used for description.

An IP address of the private network does not depend on a physical network topology, and is easier to migrate in future. The effect of the private network priority is preferentially placing the VM on the host machine that supports the private network, so that future migration is more convenient and flexible.

For the concurrent task priority, a smaller value of the taskPrio indicates a higher priority. A concurrent task priority may be determined for each host machine. The quantity of current tasks on the host machine is determined, and if the quantity of tasks is less than a preset threshold, 0 is assigned to the taskPrio; otherwise, the quantity of current tasks is assigned to the taskPrio. For example, the preset threshold of the quantity of concurrent tasks is 3 by default. Certainly, the preset threshold may be flexibly configured according to actual requirements.

The concurrent tasks on the host machine may be performed simultaneously, and the concurrency is excessively high. Therefore, the creation of the VM may be slow or even fail. The effect of the concurrent task priority is preferentially placing the VM on a host machine with a smaller quantity of concurrent tasks, to ensure the success rate and the real-time performance of creating the VM.

For the historical error priority, a smaller value of the errorPrio indicates a higher priority. A historical error priority may be calculated for each host machine. The quantity of historical errors of the host machine in a last period of time (for example, 24 hours by default) is determined. If the quantity of historical errors is less than an error threshold, 0 is assigned to the errorPrio; otherwise, the quantity of historical errors is assigned to the errorPrio. For example, the error threshold may be 5 by default, and the error threshold may be flexibly configured according to actual requirements.

A host machine in which a plurality of errors occur in a short period of time may suffer from some type of fault, and before the host machine is processed, if the VM continues to be placed on the host machine, the task of creating the VM may fail, and the success rate is reduced. The effect of the historical error priority is preferentially placing the VM on a host machine in which no excessive errors occur, thereby improving the success rate of creating the VM.

For the anti-affinity priority, a smaller value of the affinityPrio indicates a higher priority. An anti-affinity priority may be calculated for each host machine. The quantity of existing VMs of a VM user on the host machine is determined, and if the quantity of VMs is less than an affinity threshold, 0 is assigned to the affinityPrio; otherwise, the quantity of existing VMs is assigned to the affinityPrio. For example, the affinity threshold is 3, and certainly, the affinity threshold may be flexibly configured according to actual requirements.

In a large-scale distributed system, it is nearly impossible to completely avoid errors. If VMs of a user are clustered on one or more host machines the VMs on the host machines are all affected when the host machines are faulty, severely affecting the availability of the user's entire application. The effect of the anti-affinity priority is making VMs of a same user be widely distributed on different host machines, to perform distributed disaster recovery, so that a fault of a single host machine has a relatively limited impact on the availability of the entire application, thereby improving the stability and the availability of the user's application.

For the idleness priority, a smaller value of the freePrio indicates a higher priority. For example, whether each host machine is completely idle may be determined. If each host machine is completely idle, 0 is assigned to the freePrio; otherwise, 1 is assigned to the freePrio. Alternatively, if each host machine is completely idle, 1 is assigned to the freePrio; otherwise, 0 is assigned to the freePrio, and the like. For ease of description, in the embodiments of this application, an example in which if each host machine is completely idle, 0 is assigned to the freePrio; otherwise, 1 is assigned to the freePrio is used for description.

The effect of the idleness priority is protecting an idle host machine, and preferentially placing the VM on a non-idle host machine, to fully use resources on the non-idle host machine, thereby improving the resource utilization.

For the image cache priority, a smaller value of the imgPrio indicates a higher priority. The candidate host machine list may be traversed to determine whether each host machine has an image file required by the VM. For example, if each host machine has the image file, 0 is assigned to the imgPrio; otherwise, 1 is assigned to the imgPrio.

The effect of the image cache priority is preferentially placing the VM on a host machine that has stored a VM image, so that a step of image downloading may be omitted when the VM is actually produced, to reduce a production time, and improve the real-time performance of the VM production process.

For the fragmentation ratio priority, a smaller value of the fragmentPrio indicates a higher priority. A fragmentation ratio priority may be calculated for each host machine. The priority is calculated according to resources in two dimensions: CPU and internal memory. In a default case, the fragmentation ratio priority is equal to a fragmentation ratio of the CPU multiplied by a fragmentation ratio of the internal memory.

The effect of the fragmentation ratio priority is fully using the resources of the host machine to reduce the resource fragmentation ratio, to further improve the resource utilization and reduce the operational costs.

After the determining subunit 5051 determines the priority values of each candidate host machine in the dimensions, the generating subunit 5052 ranks the host machines in descending order of the priority values in the dimensions to obtain a candidate host machine list, and the creation subunit 5055 determines a most suitable candidate host machine in the candidate host machine list as the target host machine. A specific determining process may be as follows:

The generating subunit 5052 may rank the host machines in descending order of the priority values in the same dimension based on the descending order of the priorities of the dimensions, and rank host machines with a same priority value in one dimension again according to respective priority values in a next dimension, thus obtaining the candidate host machine list in which the host machines are ranked in descending order of the priorities.

After the candidate host machines are ranked, the candidate host machine ranked first is optimal. Another creation task may exist in the optimal candidate host machine. Therefore, the success of the creation cannot be necessarily ensured, and the target host machine needs to be determined in a manner of simulating deduction of resources.

In the process of determining the target host machine, first, the deduction subunit 5053 deducts the resource requirement of the to-be-created VM from candidate host machines one by one according to rankings of the ranked candidate host machines in the candidate host machine list, to obtain a remaining resource corresponding to each candidate host machine, thereby completing the simulation of deduction of resources on the host machine. The resource requirement of the VM is included in the VM information corresponding to the VM. That is, the resource requirement of the to-be-created VM is deducted one by one from the candidate host machines starting from the candidate host machine ranked first in descending order of the ranked candidate host machines. When the resource requirement is successfully deducted from a candidate host machine, the candidate host machine on which the deduction succeeds is used as the target host machine.

The ranking order may be preset. For example, a default ranking standard and a descending order of priorities may be: a private network priority (vpcPrio), a concurrent task priority (taskPrio), a historical error priority (errorPrio), an anti-affinity priority (affinityPrio), an idleness priority (freePrio), an image cache priority (imgPrio), and a fragmentation ratio priority (fragmentPrio). The ranking standard may also be selected in a default standard range, and the order may be adjusted and configured flexibly according to actual requirements.

Then, after obtaining the remaining resource of the candidate host machine, the submitting subunit 5054 submits the remaining resource to the common resource information, and in a case that the remaining resource corresponding to one candidate host machine is successfully submitted, the candidate host machine on which submission succeeds is set to the target host machine. Alternatively, the remaining resource of the candidate host machine is written to a database used for maintaining remaining resource data of each host machine. When the write succeeds, the candidate host machine on which the write succeeds is used as the target host machine.

After determining the target host machine, the creation subunit 5055 may create the VM on the target host machine. In some embodiments, because the creation of the VM needs to consume a resource of the target host machine, the host machine information in the resource information private copy may be updated, and the cloud computing system may be further instructed to update the common resource information.

In a case that the remaining resource corresponding to the candidate host machine fails to be submitted, it indicates that a scheduling conflict possibly occurs, that is, a plurality of resource scheduling processes simultaneously select the same host machine. In this case, it is determined whether the quantity of submission times exceeds a quantity threshold. If not, the host machine information of the candidate host machine is obtained again, and the resource requirement of the to-be-created VM is deducted, to obtain the remaining resource again. Then, the remaining resource obtained again is submitted to the common resource information again. If the quantity of submission times exceeds the quantity threshold, a next candidate host machine is obtained from the candidate host machine list to perform the simulation of deduction of the resource.

When the deduction succeeds on the first host machine, the first host machine may be directly determined as the target host machine without performing the deduction operation on the second host machine. When the deduction is unsuccessful on the first host machine, the deduction operation needs to be performed on the second host machine until the deduction succeeds on a host machine.

Figure 11:
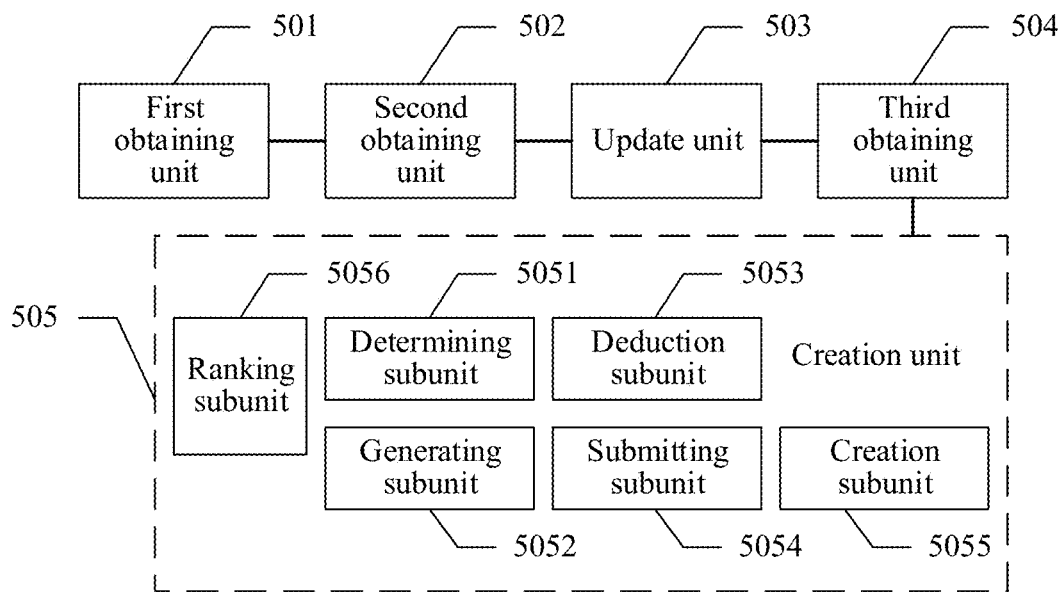
FIG. 11 is a schematic structural diagram of a resource scheduling apparatus according to an embodiment of this application.

Further, as shown in FIG. 11, the creation unit 505 further includes:

a ranking subunit 5056, configured to: re-rank a preset quantity of top candidate host machines in the candidate host machine list, to generate a candidate host machine target list, where the deduction subunit 5053 is specifically configured to deduct a resource requirement of the to-be-created VM from candidate host machines one by one according to rankings of the candidate host machines in the candidate host machine target list, to obtain remaining resources.

The preset quantity may be flexibly set according to actual requirements. The ranking subunit 5056 may randomly re-rank the preset quantity of top candidate host machines in the candidate host machine list, or may re-rank the preset quantity of top candidate host machines in the candidate host machine list according to a preset rule. The specific re-ranking manner is not limited herein. An objective of re-ranking the preset quantity of top candidate host machines in the candidate host machine list is to randomly scatter the first k (k is the preset quantity) candidate host machines in the candidate host machine list for re-ranking, and obtain the candidate host machine target list, so that a plurality of resource scheduling processes can be prevented from selecting the same target host machine in a concurrency scenario, effectively avoiding scheduling conflicts.

It can be seen from the foregoing that, in this embodiment of this application, the first obtaining unit 501 obtains VM information corresponding to a to-be-created VM, and the second obtaining unit 502 obtains common resource information. The common resource information includes host machine information corresponding to all host machines in a cloud computing system. Then, the update unit 503 updates a preset resource information private copy according to the common resource information and the VM information. The resource information private copy includes host machine information corresponding to a preset host machine. Finally, the third obtaining unit 504 obtains, according to the resource information private copy, at least one candidate host machine meeting the VM information, and the creation unit 505 obtains a target host machine from the at least one candidate host machine, and creates the VM on the target host machine. In the solution, the resource information private copy can be updated in time before the resource scheduling is performed, which ensures synchronization of the resource information private copy and the common resource information, so that a better resource scheduling result is achieved, and there is no need to wait during the resource scheduling, improving the efficiency of the resource scheduling.

Correspondingly, an embodiment of this application further provides a cloud computing system, including at least one scheduler and at least one host machine. The scheduler includes any resource scheduling apparatus provided in the embodiments of this application. For details, reference may be made to the embodiment corresponding to the foregoing resource scheduling apparatus. The resource scheduling apparatus may be specifically integrated into a scheduling server. For example, details may be as follows:

The scheduling server is configured to: obtain VM information corresponding to a to-be-created VM; obtain common resource information, the common resource information including host machine information corresponding to all host machines in a cloud computing system; update a preset resource information private copy according to the common resource information and the VM information, the resource information private copy including host machine information corresponding to a preset host machine; obtain, according to the resource information private copy, at least one candidate host machine meeting the VM information; and obtain a target host machine from the at least one candidate host machine, and create the VM on the target host machine.

For specific implementations of the foregoing devices, reference may be made to the foregoing embodiments. Details are not described herein again.

The cloud computing system may include any resource scheduling apparatus provided in the embodiments of this application, and therefore, can achieve the beneficial effects that can be achieved by any cloud computing system provided in the embodiments of this application. For details, reference may be made to the foregoing embodiments. Details are not described herein again.

Figure 12:
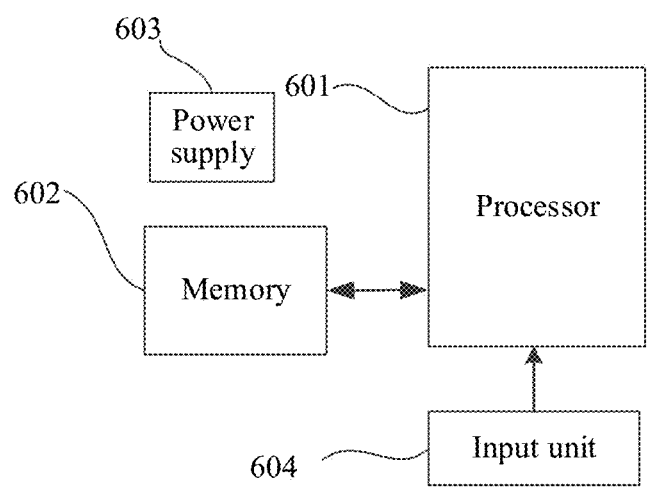
FIG. 12 is a schematic structural diagram of a scheduling server according to an embodiment of this application.

An embodiment of this application further provides a scheduling server. The scheduling server may be any scheduler described in the embodiments of this application. FIG. 12 is a schematic structural diagram of a scheduling server involved in the embodiments of this application. Details are as follows:

The scheduling server may include components such as a processor 601 including one or more processing cores, a memory 602 including one or more computer-readable storage mediums, a power supply 603, and an input unit 604. A person skilled in the art may understand that the structure of the scheduling server shown in FIG. 12 does not constitute a limitation on the scheduling server. The scheduling server may include more or fewer parts than those shown in the figure, may combine some parts, or may have different part arrangements.

The processor 601 is a control center of the scheduling server, and is connected to various parts of the entire scheduling server by using various interfaces and lines. By running or executing a software program and/or module stored in the memory 602, and invoking data stored in the memory 602, the processor 601 executes various functions of the scheduling server and performs data processing, thereby monitoring the entire scheduling server. In some embodiments, the processor 601 may include one or more processing cores. The processor 601 may integrate an application processor and a modem processor. The application processor mainly processes an operating system, a user interface, an application program, and the like. The modem processor mainly processes wireless communication. It may be understood that the foregoing modem processor may alternatively not be integrated into the processor 601.

The memory 602 may be configured to store a software program and module. The processor 601 runs one or more programs and modules stored in the memory 602, to execute various functional applications and data processing. The memory 602 may mainly include a program storage area and a data storage area. The program storage area may store an operating system, an application program required by at least one function (such as a sound playing function and an image display function), and the like. The data storage area may store data created according to use of the scheduling server, and the like. In addition, the memory 602 may include a high speed random access memory, and may further include a nonvolatile memory, such as at least one magnetic disk storage device, a flash memory, or another volatile solid-state storage device. Correspondingly, the memory 602 may further include a memory controller, to provide access of the processor 601 to the memory 602.

The scheduling server further includes the power supply 603 for supplying power to the components. The power supply 603 may be logically connected to the processor 601 by using a power management system, thereby implementing functions such as charging, discharging, and power consumption management by using the power management system. The power supply 603 may further include one or more of a direct current or alternate current power supply, a re-charging system, a power fault detection circuit, a power converter or inverter, a power state indicator, or any other components.

The scheduling server may further include the input unit 604 configured to receive input digit or character information, and generate a keyboard, mouse, joystick, optical, or track ball signal input related to the user setting and function control.

Although not shown in the figure, the scheduling server may further include a display unit. Details are not further described herein. Specifically, in this embodiment, the processor 601 in the scheduling server may load executable files corresponding to processes of the one or more application programs to the memory 602 according to the following instructions, and runs the application programs stored in the memory 602, so as to implement the following various functions:

obtaining VM information corresponding to a to-be-created VM; obtaining common resource information, the common resource information including host machine information corresponding to all host machines in a cloud computing system; updating a preset resource information private copy according to the common resource information and the VM information, the resource information private copy including host machine information corresponding to a preset host machine; obtaining, according to the resource information private copy, at least one candidate host machine meeting the VM information; and obtaining a target host machine from the at least one candidate host machine, and creating the VM on the target host machine.

For a specific implementation of each of the foregoing operations, reference may be made to the foregoing embodiments. This is not described herein again.

It can be seen from the foregoing that, in this embodiment of this application, the scheduling server may obtain VM information corresponding to a to-be-created VM and obtain common resource information, the common resource information including host machine information corresponding to all host machines in a cloud computing system; then, update a preset resource information private copy according to the common resource information and the VM information, the resource information private copy including host machine information corresponding to a preset host machine; and finally, obtain, according to the resource information private copy, at least one candidate host machine meeting the VM information, obtain a target host machine from the at least one candidate host machine, and create the VM on the target host machine. In the solution, the resource information private copy can be updated in time before the resource scheduling is performed, which ensures synchronization of the resource information private copy and the common resource information, so that a better resource scheduling result is achieved, and there is no need to wait during the resource scheduling, improving the efficiency of the resource scheduling.

A person of ordinary skill in the art could understand that, all or some steps of various methods in the embodiments may be implemented through instructions, or implemented through instructions controlling relevant hardware, and the instructions may be stored in a computer-readable storage medium and loaded and executed by a processor.

Accordingly, an embodiment of this application provides a storage medium, storing a plurality of instructions, the instructions being suitable to be loaded by the processor, to perform the steps in any resource scheduling method according to the embodiments of this application. For example, the instructions may perform the following steps:

obtaining VM information corresponding to a to-be-created VM; obtaining common resource information, the common resource information including host machine information corresponding to all host machines in a cloud computing system; updating a preset resource information private copy according to the common resource information and the VM information, the resource information private copy including host machine information corresponding to a preset host machine; obtaining, according to the resource information private copy, at least one candidate host machine meeting the VM information; and obtaining a target host machine from the at least one candidate host machine, and creating the VM on the target host machine.

For a specific implementation of each of the foregoing operations, reference may be made to the foregoing embodiments. This is not described herein again.

The storage medium may include: a read-only memory (ROM), a random access memory (RAM), a magnetic disk, an optical disc, or the like.

Since the instructions stored in the storage medium may perform the steps of any resource scheduling method in the embodiments of this application, the instructions can achieve beneficial effects that may be achieved by any resource scheduling method in the embodiments of this application. For details, reference may be made to the foregoing embodiments. Details are not further described herein.

The resource scheduling method and apparatus, the cloud computing system, and the storage medium provided in the embodiments of this application are described in detail in the foregoing. The principle and implementations of this application are described herein by using specific examples. The descriptions of the foregoing embodiments are merely used for helping understand the method and core ideas of this application. In addition, a person skilled in the art can make variations to this application in terms of the specific implementations and application scopes according to the ideas of this application. Therefore, the content of this specification shall not be construed as a limitation on this application.

What is claimed is:

1. A resource scheduling method performed at a scheduling server having one or more processors and memory storing a plurality of programs to be executed by the one or more processors, the method comprising:

obtaining, by the scheduling server, virtual machine (VM) information corresponding to a to-be-created VM;

obtaining, by the scheduling server, common resource information, the common resource information comprising host machine information corresponding to all host machines in a cloud computing system;

updating, by the scheduling server, a preset resource information private copy according to the common resource information, the resource information private copy comprising host machine information corresponding to a preset host machine;

obtaining, by the scheduling server according to the updated resource information private copy, at least one candidate host machine meeting the VM information; and obtaining, by the scheduling server, a target host machine from the at least one candidate host machine, and creating the VM on the target host machine, further including:

determining, by the scheduling server, priority values of the at least one candidate host machine in respective dimensions of the at least one candidate host machine;

performing ranking, by the scheduling server, in a descending order of the priority values of the at least one candidate host machine in the respective dimensions of the at least one candidate host machine, to generate a candidate host machine list;

selecting, by the scheduling server, a preset quantity of top candidate host machines in the candidate host machine list, to generate a candidate host machine target list;

deducting, by the scheduling server, a resource requirement of the to-be-created VM from candidate host machines in the candidate host machine target list one by one according to rankings in the descending order of the candidate host machines in the candidate host machine target list, to obtain remaining resources of the candidate host machines;

submitting, by the scheduling server, the remaining resources of the candidate host machines one by one according to the rankings in the descending order of the candidate host machines in the candidate host machine list to the common resource information until the remaining resource corresponding to a first one candidate host machine of the candidate host machines is successfully submitted; and when the remaining resource corresponding to the first one candidate host machine of the candidate host machines is successfully submitted, setting, by the scheduling server, the first one candidate host machine on which submission succeeds to the target host machine.

2. The resource scheduling method according to claim 1, wherein the updating, by the scheduling server, a preset resource information private copy according to the common resource information comprises:

synchronizing, by the scheduling server, the resource information private copy with the common resource information.

3. The resource scheduling method according to claim 1, wherein the updating, by the scheduling server, a preset resource information private copy according to the common resource information comprises:

performing, by the scheduling server, screening to obtain target host machine information meeting the VM information from the common resource information, and adding the target host machine information to the preset resource information private copy.

4. The resource scheduling method according to claim 3, wherein the performing, by the scheduling server, screening to obtain target host machine information meeting the VM information from the common resource information, and adding the target host machine information to the preset resource information private copy comprises:

performing, by the scheduling server, screening to obtain target host machine information meeting the VM information from the common resource information in a case that the resource information private copy is updated for the first time;

copying, by the scheduling server, the target host machine information to the resource information private copy;

obtaining, by the scheduling server, a current timestamp, and setting the current timestamp to a full update timestamp and an incremental update timestamp; and storing, by the scheduling server, the full update timestamp and the incremental update timestamp into the resource information private copy.

5. The resource scheduling method according to claim 3, wherein the performing, by the scheduling server, screening to obtain target host machine information meeting the VM information from the common resource information, and adding the target host machine information to the preset resource information private copy comprises:

obtaining, by the scheduling server, a time difference between a current timestamp and a previous full update timestamp in a case that the resource information private copy is not updated for the first time;

determining, by the scheduling server, whether the time difference is greater than a preset full update threshold;

performing, by the scheduling server, screening to obtain first target host machine information meeting the VM information from the common resource information in a case that the time difference is greater than the full update threshold;

copying, by the scheduling server, the first target host machine information to the resource information private copy;

setting, by the scheduling server, the current timestamp to a first full update timestamp and a first incremental update timestamp; and storing, by the scheduling server, the first full update timestamp and the first incremental update timestamp into the resource information private copy.

6. The resource scheduling method according to claim 5, wherein after the determining, by the scheduling server, whether the time difference is greater than a preset full update threshold, the method further comprises:

obtaining, by the scheduling server, updated host machine information of which an update timestamp is greater than a previous incremental update timestamp from the common resource information in a case that the time difference is less than or equal to the full update threshold;

obtaining, by the scheduling server, second target host machine information meeting the VM information from the host machine information;

adding, by the scheduling server, the second target host machine information to the resource information private copy;

setting, by the scheduling server, the current timestamp to a second incremental update timestamp; and storing, by the scheduling server, the second incremental update timestamp into the resource information private copy.

7. The resource scheduling method according to claim 1, wherein the selecting, by the scheduling server, a preset quantity of top candidate host machines in the candidate host machine list, to generate a candidate host machine target list comprises:

randomly selecting, by the scheduling server, the preset quantity of top candidate host machines in the candidate host machine list, to obtain the candidate host machine target list.

8. The resource scheduling method according to claim 1, wherein the submitting, by the scheduling server, the remaining resources of the candidate host machines one by one according to the rankings of the candidate host machines in the candidate host machine list to the common resource information until the remaining resource of a first one candidate host machine of the candidate host machines is successfully submitted comprises:

determining, by the scheduling server in a case of failing to submit the remaining resource of one candidate host machine, whether a quantity of submission times of the remaining resource of the candidate host machine exceeds a scheduling conflict threshold;

obtaining, by the scheduling server, latest resource data of the candidate host machine, and re-determining the remaining resource corresponding to the candidate host machine in a case that the quantity of submission times of the remaining resource of the candidate host machine does not exceed the scheduling conflict threshold; and deducting, by the scheduling server, the resource requirement of the to-be-created VM from a next candidate host machine in the candidate host machine list to obtain a corresponding remaining resource, and submitting the corresponding remaining resource in a case that the quantity of submission times of the remaining resource of the candidate host machine exceeds the scheduling conflict threshold.

9. The resource scheduling method according to claim 1, wherein the obtaining, by the scheduling server according to the resource information private copy, at least one candidate host machine meeting the VM information comprises:

filtering, by the scheduling server, the host machine in the resource information private copy according to a resource requirement in the VM information, to obtain the at least one candidate host machine.

10. A scheduling server comprising one or more processors, memory coupled to the one or more processors and a plurality of programs stored in the memory that, when executed by the one or more processors, cause the scheduling server to perform a plurality of operations comprising:

obtaining, by the scheduling server, virtual machine (VM) information corresponding to a to-be-created VM;

obtaining, by the scheduling server, common resource information, the common resource information comprising host machine information corresponding to all host machines in a cloud computing system;

updating, by the scheduling server, a preset resource information private copy according to the common resource information, the resource information private copy comprising host machine information corresponding to a preset host machine;

obtaining, by the scheduling server according to the updated resource information private copy, at least one candidate host machine meeting the VM information; and obtaining, by the scheduling server, a target host machine from the at least one candidate host machine, and creating the VM on the target host machine, further including:

determining, by the scheduling server, priority values of the at least one candidate host machine in respective dimensions of the at least one candidate host machine;

performing ranking, by the scheduling server, in a descending order of the priority values of the at least one candidate host machine in the respective dimensions of the at least one candidate host machine, to generate a candidate host machine list;

selecting, by the scheduling server, a preset quantity of top candidate host machines in the candidate host machine list, to generate a candidate host machine target list;

deducting, by the scheduling server, a resource requirement of the to-be-created VM from candidate host machines in the candidate host machine target list one by one according to rankings in the descending order of the candidate host machines in the candidate host machine target list, to obtain remaining resources of the candidate host machines;

submitting, by the scheduling server, the remaining resources of the candidate host machines one by one according to the rankings in the descending order of the candidate host machines in the candidate host machine list to the common resource information until the remaining resource corresponding to a first one candidate host machine of the candidate host machines is successfully submitted; and when the remaining resource corresponding to the first one candidate host machine of the candidate host machines is successfully submitted, setting, by the scheduling server, the first one candidate host machine on which submission succeeds to the target host machine.

11. The scheduling server according to claim 10, wherein the updating, by the scheduling server, a preset resource information private copy according to the common resource information comprises:

synchronizing, by the scheduling server, the resource information private copy with the common resource information.

12. The scheduling server according to claim 10, wherein the updating, by the scheduling server, a preset resource information private copy according to the common resource information comprises:

performing, by the scheduling server, screening to obtain target host machine information meeting the VM information from the common resource information, and adding the target host machine information to the preset resource information private copy.

13. The scheduling server according to claim 12, wherein the performing, by the scheduling server, screening to obtain target host machine information meeting the VM information from the common resource information, and adding the target host machine information to the preset resource information private copy comprises:

performing, by the scheduling server, screening to obtain target host machine information meeting the VM information from the common resource information in a case that the resource information private copy is updated for the first time;

copying, by the scheduling server, the target host machine information to the resource information private copy;

obtaining, by the scheduling server, a current timestamp, and setting the current timestamp to a full update timestamp and an incremental update timestamp; and storing, by the scheduling server, the full update timestamp and the incremental update timestamp into the resource information private copy.

14. The scheduling server according to claim 12, wherein the performing, by the scheduling server, screening to obtain target host machine information meeting the VM information from the common resource information, and adding the target host machine information to the preset resource information private copy comprises:

obtaining, by the scheduling server, a time difference between a current timestamp and a previous full update timestamp in a case that the resource information private copy is not updated for the first time;

determining, by the scheduling server, whether the time difference is greater than a preset full update threshold;

performing, by the scheduling server, screening to obtain first target host machine information meeting the VM information from the common resource information in a case that the time difference is greater than the full update threshold;

copying, by the scheduling server, the first target host machine information to the resource information private copy;

setting, by the scheduling server, the current timestamp to a first full update timestamp and a first incremental update timestamp; and storing, by the scheduling server, the first full update timestamp and the first incremental update timestamp into the resource information private copy.

15. The scheduling server according to claim 10, wherein the selecting, by the scheduling server, a preset quantity of top candidate host machines in the candidate host machine list, to generate a candidate host machine target list comprises:
randomly selecting, by the scheduling server, the preset quantity of top candidate host machines in the candidate host machine list, to obtain the candidate host machine target list.

16. A non-transitory computer readable storage medium storing a plurality of machine readable instructions in connection with a scheduling server having one or more processors, wherein the plurality of machine readable instructions, when executed by the one or more processors, cause the scheduling server to perform a plurality of operations including:
obtaining, by the scheduling server, virtual machine (VM) information corresponding to a to-be-created VM;
obtaining, by the scheduling server, common resource information, the common resource information comprising host machine information corresponding to all host machines in a cloud computing system;
updating, by the scheduling server, a preset resource information private copy according to the common resource information, the resource information private copy comprising host machine information corresponding to a preset host machine;
obtaining, by the scheduling server according to the updated resource information private copy, at least one candidate host machine meeting the VM information; and
obtaining, by the scheduling server, a target host machine from the at least one candidate host machine, and creating the VM on the target host machine, further including:
determining, by the scheduling server, priority values of the at least one candidate host machine in respective dimensions of the at least one candidate host machine;
performing ranking, by the scheduling server, in a descending order of the priority values of the at least one candidate host machine in the respective dimensions of the at least one candidate host machine, to generate a candidate host machine list;
selecting, by the scheduling server, a preset quantity of top candidate host machines in the candidate host machine list, to generate a candidate host machine target list;
deducting, by the scheduling server, a resource requirement of the to-be-created VM from candidate host machines in the candidate host machine target list one by one according to rankings in the descending order of the candidate host machines in the candidate host machine target list, to obtain remaining resources of the candidate host machines;
submitting, by the scheduling server, the remaining resources of the candidate host machines one by one according to the rankings in the descending order of the candidate host machines in the candidate host machine list to the common resource information until the remaining resource corresponding to a first one candidate host machine of the candidate host machines is successfully submitted; and
when the remaining resource corresponding to the first one candidate host machine of the candidate host machines is successfully submitted, setting, by the scheduling server, the first one candidate host machine on which submission succeeds to the target host machine.

17. The non-transitory computer readable storage medium according to claim 16, wherein the updating, by the scheduling server, a preset resource information private copy according to the common resource information comprises:
synchronizing, by the scheduling server, the resource information private copy with the common resource information.

18. The non-transitory computer readable storage medium according to claim 16, wherein the updating, by the scheduling server, a preset resource information private copy according to the common resource information comprises:
performing, by the scheduling server, screening to obtain target host machine information meeting the VM information from the common resource information, and adding the target host machine information to the preset resource information private copy.

19. The non-transitory computer readable storage medium according to claim 16, wherein the selecting, by the scheduling server, a preset quantity of top candidate host machines in the candidate host machine list, to generate a candidate host machine target list comprises:
randomly selecting, by the scheduling server, the preset quantity of top candidate host machines in the candidate host machine list, to obtain the candidate host machine target list.

* * * * *